United States Patent
Hao et al.

(10) Patent No.: US 11,956,147 B2
(45) Date of Patent: Apr. 9, 2024

(54) DATA TRANSMISSION METHOD, APPARATUS, AND DEVICE, AND COMPUTER STORAGE MEDIUM

(71) Applicant: TENCENT TECHNOLOGY (SHENZHEN) COMPANY LIMITED, Shenzhen (CN)

(72) Inventors: Jingjing Hao, Shenzhen (CN); Dan Zhang, Shenzhen (CN); Binhui Ning, Shenzhen (CN); Xiaobo Hu, Shenzhen (CN); Feihu Sun, Shenzhen (CN); Liuteng Li, Shenzhen (CN); Jianbo Xu, Shenzhen (CN); Zhenlin Huang, Shenzhen (CN); Shuai Ma, Shenzhen (CN); Guoqiang Che, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 148 days.

(21) Appl. No.: 17/357,977

(22) Filed: Jun. 24, 2021

(65) Prior Publication Data
US 2021/0320862 A1    Oct. 14, 2021

Related U.S. Application Data

(63) Continuation of application No. PCT/CN2020/086356, filed on Apr. 23, 2020.

(30) Foreign Application Priority Data

May 17, 2019    (CN) .......................... 201910412034.4

(51) Int. Cl.
*H04L 45/42*    (2022.01)
*H04L 45/00*    (2022.01)
*H04L 67/563*    (2022.01)

(52) U.S. Cl.
CPC .............. *H04L 45/42* (2013.01); *H04L 45/22* (2013.01); *H04L 45/566* (2013.01); *H04L 67/563* (2022.05)

(58) Field of Classification Search
CPC ....... H04L 45/42; H04L 67/563; H04L 45/22; H04L 45/566; H04L 45/24; H04L 45/247; H04L 45/52; H04L 67/565
(Continued)

(56) References Cited

U.S. PATENT DOCUMENTS 5,960,035 A * 9/1999 Sridhar ................. H04L 5/1446
375/222
9,008,673 B1 * 4/2015 Sanjeev .................. H04L 67/75
709/224

(Continued)

FOREIGN PATENT DOCUMENTS

CN    102656862 A    9/2012
CN    103493399 A    1/2014
(Continued)

OTHER PUBLICATIONS

The Japan Patent Office (JPO) Notification of Reasons for Refusal for Application No. 2021-535153 dated Aug. 1, 2022 18 pages (including translation).
(Continued)

*Primary Examiner* — Madhu Woolcock
(74) *Attorney, Agent, or Firm* — ANOVA LAW GROUP, PLLC

(57) ABSTRACT

A data transmission method, apparatus, and device, and a computer storage medium are provided. The method includes: obtaining an application packet of a target application; transmitting the application packet to a first routing device by using a network data channel, and transmitting, by using the first routing device, the application packet to a (Continued)

proxy server; meanwhile, transmitting the same application packet to a second routing device by using a short-range wireless data channel different from the network data channel, and transmitting, by using the second routing device, the application packet to the proxy server. The proxy server performs, a deduplication mechanism on the application packet and transmit the application packet to an application server corresponding to the target application.

20 Claims, 8 Drawing Sheets

(58) Field of Classification Search
USPC .......................................................... 709/238
See application file for complete search history.

(56) References Cited

U.S. PATENT DOCUMENTS

| | | | |
|---|---|---|---|
| 9,509,743 B1* | 11/2016 | Mulcahy | H04W 8/04 |
| 9,788,144 B1* | 10/2017 | Anantharaman | H04L 67/565 |
| 2004/0081159 A1* | 4/2004 | Pan | H04L 65/1069 |
| | | | 370/395.2 |
| 2004/0151186 A1* | 8/2004 | Akama | H04L 63/08 |
| | | | 370/395.3 |
| 2004/0203382 A1* | 10/2004 | Park | H04L 65/1101 |
| | | | 455/88 |
| 2005/0063416 A1* | 3/2005 | Shin | H04W 88/06 |
| | | | 370/465 |
| 2005/0272467 A1* | 12/2005 | Chiu | H04B 1/40 |
| | | | 455/552.1 |
| 2006/0105810 A1* | 5/2006 | Gnuschke | H04M 3/42178 |
| | | | 455/558 |
| 2007/0217411 A1* | 9/2007 | Danzeisen | H04W 8/14 |
| | | | 370/389 |
| 2007/0280105 A1* | 12/2007 | Barkay | H04L 47/10 |
| | | | 370/469 |
| 2008/0040487 A1* | 2/2008 | Lioy | H04L 69/162 |
| | | | 709/227 |
| 2011/0314129 A1 | 12/2011 | Rezaiifar et al. | |
| 2012/0171952 A1* | 7/2012 | Ohira | H04M 1/72412 |
| | | | 455/41.1 |
| 2012/0233326 A1* | 9/2012 | Shaffer | H04W 4/70 |
| | | | 709/225 |
| 2012/0314631 A1* | 12/2012 | Yang | H04L 69/08 |
| | | | 370/310 |
| 2013/0021169 A1* | 1/2013 | Soomro | G16H 40/67 |
| | | | 600/300 |
| 2013/0028143 A1* | 1/2013 | Vasseur | H04W 40/30 |
| | | | 370/256 |
| 2013/0114606 A1* | 5/2013 | Schrum, Jr. | H04L 45/22 |
| | | | 370/389 |
| 2013/0286814 A1 | 10/2013 | Lee et al. | |
| 2013/0308597 A1 | 11/2013 | Murphy et al. | |
| 2014/0295780 A1* | 10/2014 | Amano | H04L 12/1818 |
| | | | 455/90.1 |
| 2015/0049667 A1 | 2/2015 | Oda et al. | |
| 2016/0014632 A1* | 1/2016 | Siow | H04L 65/764 |
| | | | 370/230 |
| 2016/0112303 A1* | 4/2016 | Yoo | H04L 45/24 |
| | | | 398/45 |
| 2016/0308907 A1* | 10/2016 | Le | H04W 76/12 |
| 2016/0337104 A1* | 11/2016 | Kalligudd | H04L 12/4641 |
| 2017/0078956 A1* | 3/2017 | LeBlanc | H04L 45/70 |
| 2017/0135146 A1* | 5/2017 | Kellermann | H04W 76/15 |
| 2017/0171697 A1 | 6/2017 | Song | |
| 2017/0265127 A1 | 9/2017 | Kim et al. | |
| 2017/0366508 A1* | 12/2017 | Saraf | H04L 65/80 |
| 2017/0373864 A1* | 12/2017 | Li | H04L 12/1877 |
| 2018/0092112 A1* | 3/2018 | Jung | H04W 72/566 |
| 2018/0167829 A1* | 6/2018 | Luo | H04L 1/0058 |
| 2018/0324828 A1 | 11/2018 | Mukherjee et al. | |
| 2019/0045583 A1* | 2/2019 | Van Phan | H04J 11/0093 |
| 2019/0104437 A1* | 4/2019 | Bartfai-Walcott | |
| | | | H04W 28/0231 |
| 2019/0140959 A1* | 5/2019 | Lin | H04L 47/24 |
| 2020/0084697 A1* | 3/2020 | Sridhara | H04W 4/06 |

FOREIGN PATENT DOCUMENTS

| | | |
|---|---|---|
| CN | 108777664 A | 11/2018 |
| CN | 109600388 A | 4/2019 |
| CN | 110099403 A | 8/2019 |
| CN | 110300115 A | 10/2019 |
| JP | 2015037275 A | 2/2015 |

OTHER PUBLICATIONS

The European Patent Office (EPO) The Extended European Search Report for 20810604.7 dated May 20, 2022 7 pages.
"3rd Generation Partnership Project; Technical Specification Group Services and System Aspects; Study on Access Traffic Steering, Switching and Splitting support in the 5G system architecture (Release 16)," 3GPP Standard; Technical Report; 3GPP TR 23.793, vol. SA WG2, No. V0.6.0, Aug. 13, 2018 (Aug. 13, 2018), pp. 1-80.
The World Intellectual Property Organization (WIPO) International Search Report for PCT/CN2020/086356 dated Jul. 23, 2020 5 Pages (including translation).
The State Intellectual Property Office of the People's Republic of China (SIPO) Office Action 1 for for 201910412034.4 dated May 28, 2021 10 Pages (including translation).

* cited by examiner

DATA TRANSMISSION METHOD, APPARATUS, AND DEVICE, AND COMPUTER STORAGE MEDIUM

CROSS-REFERENCES TO RELATED APPLICATIONS

This application is a continuation application of PCT Patent Application No. PCT/CN2020/086356, entitled "DATA TRANSMISSION METHOD AND APPARATUS, DEVICE, AND COMPUTER STORAGE MEDIUM" and filed on Apr. 23, 2020, which claims priority to Chinese Patent Application No. 201910412034.4, filed on May 17, 2019, which are incorporated herein by reference in their entirety.

FIELD OF THE TECHNOLOGY

The present disclosure relates to the field of communication technologies, and in particular, to a data transmission method, apparatus, and device, and a computer storage medium.

BACKGROUND OF THE DISCLOSURE

With the gradual popularization of terminal devices, various applications that rely on the terminal devices to run emerge one after another. During running, many of the applications need to exchange data with servers by using networks. Some applications that need to frequently communicate with servers, for example, game applications that support player VS player (PVP), usually require network environments that support data transmission to meet characteristics of low latency and high stability, to ensure better usage experience for a user, for example, ensure that a battle screen is smooth and operations triggered by the user can be quickly responded to during a game battle of the user.

However, due to instability of the network environments in which the terminal devices are located, the terminal devices are prone to problems such as high latency and packet loss regardless of being connected to a wireless fidelity (Wi-Fi) network or a cellular network.

SUMMARY

Embodiments of the present disclosure provide a data transmission method, apparatus, and device, and a computer storage medium, which can effectively reduce network latency and service packet loss, and ensure smooth running of applications.

In view of this, an embodiment of the present disclosure provides a data transmission method, applicable to a terminal device, the method including: obtaining an application packet of a target application; transmitting the application packet to a proxy server via a first routing device by using a network data channel; and transmitting the same application packet to the proxy server via a second routing device by using a short-range wireless data channel different from the network data channel, the application packet being provided for the proxy server to transmit the application packet to an application server corresponding to the target application based on a deduplication mechanism.

An embodiment of the present disclosure further provides a data transmission method, applicable to a proxy server, the method including: receiving a reply packet transmitted by an application server; transmitting the reply packet to a terminal device via a network data channel by using a first routing device; and transmitting the same reply packet to the terminal device via a short-range wireless data channel different from the network data channel by using a second routing device, the reply packet being provided for the terminal device to transmit the reply packet to a target application based on a deduplication mechanism.

An embodiment of the present disclosure further provides a data transmission apparatus, including: an obtaining module, configured to obtain an application packet of a target application; a first transmission module, configured to transmit the application packet to a proxy server via a first routing device by using a network data channel; and a second transmission module, configured to transmit the same application packet to the proxy server via a second routing device by using a short-range wireless data channel different from the network data channel, the application packet being provided for the proxy server to transmit the application packet to an application server corresponding to the target application based on a deduplication mechanism.

An embodiment of the present disclosure further provides a data transmission apparatus, including: a receiving module, configured to receive a reply packet transmitted by an application server; a first transmission module, configured to transmit the reply packet to a terminal device via a network data channel by using a first routing device; and a second transmission module, configured to transmit the same reply packet to the terminal device via a short-range wireless data channel different from the network data channel by using a second routing device, the reply packet being provided for the terminal device to transmit the reply packet to a target application based on a deduplication mechanism.

An embodiment of the present disclosure further provides a terminal device, including a processor and a memory, the memory being configured to store a computer program, and transmit the computer program to the processor; and the processor being configured when running instructions in the computer program, to perform: obtaining an application packet of a target application; transmitting the application packet to a proxy server via a first routing device by using a network data channel; and transmitting the same application packet to the proxy server via a second routing device by using a short-range wireless data channel different from the network data channel. The application packet is provided for the proxy server to transmit the application packet to an application server corresponding to the target application based on a deduplication mechanism.

An embodiment of the present disclosure further provides a proxy server, including a processor and a memory, the memory being configured to store a computer program; and the processor being configured, when running instructions in the computer program, to perform: receiving a reply packet transmitted by an application server; transmitting the reply packet to a terminal device via a network data channel by using a first routing device; and transmitting the same reply packet to the terminal device via a short-range wireless data channel different from the network data channel by using a second routing device, the reply packet being provided for the terminal device to transmit the reply packet to a target application based on a deduplication mechanism.

An embodiment of the present disclosure further provides a non-transitory computer storage medium, storing a computer program. The computer program, when being executed by a processor of a terminal device, causes the processor to perform: obtaining an application packet of a target application; transmitting the application packet to a proxy server via a first routing device by using a network data channel; and transmitting the same application packet to the proxy server via a second routing device by using a short-range wireless data channel different from the network data channel. The application packet is provided for the proxy server to transmit the application packet to an application server corresponding to the target application based on a deduplication mechanism.

The application of the data transmission method, apparatus, and device, and the computer storage medium provided in the embodiments of the present disclosure has at least the following beneficial technical effects:

According to the embodiments of the present disclosure, the application packet is transmitted to the proxy server by using the two different data channels, so that the proxy server transmits the application packet to the application server corresponding to the target application based on the deduplication mechanism. The two data channels are mutually auxiliary data transmission channels in the process of transmitting the application packet, improving the stability of data transmission.

After obtaining the to-be-transmitted application packet in the target application, the terminal transmits the application packet to the proxy server via the first routing device by using the network data channel, and meanwhile, further transmits the application packet to the proxy server via the second routing device by using the short-range wireless data channel, so that the proxy server transmits the application packet to the application server based on the deduplication mechanism after receiving the application packets transmitted by the first routing device and the second routing device.

In the process of transmitting the application packet, the application packet is transmitted to the proxy server by using a non-short-range wireless data channel (for example, a Wi-Fi data channel or a cellular network data channel) and a short-range wireless data channel (for example, a Bluetooth (BT) data channel or a near field communication data channel) respectively, that is, data is transmitted by using two data channels simultaneously. In this way, the air interface packet loss rate and data latency can be effectively reduced. In addition, because the short-range wireless data channel requires less power to transmit data, power consumption and heat emission of the devices can be further reduced while ensuring data transmission quality.

DESCRIPTION OF EMBODIMENTS

Figure 1:
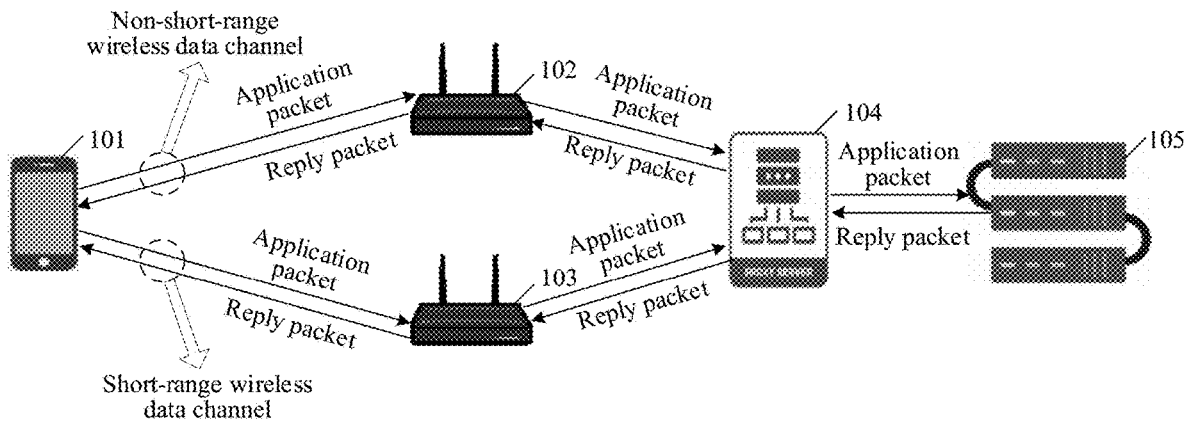
FIG. 1 is a schematic diagram of an application scenario of a data transmission method according to an embodiment of the present disclosure.

In order to enable a person skilled in the art to better under the solutions of the present disclosure, the following clearly and completely describes the technical solutions of the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The terms such as "first", "second", "third", and "fourth" (if any) in the specification and claims of the present disclosure and in the accompanying drawings are used for distinguishing similar objects and not necessarily used for describing any particular order or sequence. It is to be understood that such used data is interchangeable where appropriate so that the embodiments of the present disclosure described here can be implemented in an order other than those illustrated or described here. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In the related art, a terminal device may use a cellular network channel as an auxiliary channel for data transmission, and use the cellular network channel to assist a Wi-Fi network channel for data transmission. However, by using this data transmission method, power of the terminal device is increased, leading to heat emission of the terminal device; and in some cases, a user is unwilling to use the cellular network channel for data transmission considering traffic accounting.

Based on this, an embodiment of the present disclosure provides a data transmission method. According to the method, a short-range wireless data channel (for example, a Bluetooth data channel or a near field communication data channel) is used as an auxiliary channel for data transmission, and the auxiliary channel is used to assist another non-short-range wireless data channel (for example, a Wi-Fi data channel or a cellular network data channel) for data transmission. In this way, data transmission is performed based on a plurality of data channels, ensuring the stability and reliability of data transmission. In addition, because the short-range wireless data channel requires less power to transmit data, power consumption and heat emission of the terminal device can be reduced as much as possible while ensuring stable data transmission.

In an actual application, the user may choose to use any non-short-range wireless data channel according to requirements of the user, and use the non-short-range wireless data channel and the short-range wireless data channel to simultaneously transmit an application packet generated during running of a target application. For example, considering the traffic accounting, the user may choose to use the Wi-Fi data channel and the short-range wireless data channel to simultaneously transmit the application packet, implementing stable data transmission and reducing the power consumption of the terminal device while ensuring that no additional traffic accounting is generated.

The inventor finds during research that in one respect, although short-range wireless data transmission technologies have the advantage of low power consumption, the short-range wireless data transmission technologies are usually applied to transmission of relatively small control streams, and some short-range wireless data transmission technologies are also applied to transmission of small files in a non-real-time form. Moreover, the industry considers, by default, that a bandwidth used for short-range wireless data transmission is low, and is not suitable for transmission of an application packet with high real-time performance requirements, and in particular, is impossibly suitable for transmission of a packet of a competitive game application. Therefore, the application value of the short-range wireless data transmission technologies has never been discovered. In another respect, in an application scenario of merely using Wi-Fi for transmission of an application packet, to implement network transmission acceleration, a data stream transmission path is from the terminal device to a router, and then from the router to a server. However, a backbone network from the router to the server is actually accelerated, and an effect thereof is very good. Therefore, for the network acceleration in this scenario, all research of the industry is oriented to accelerating the backbone network, and no one has found that the Wi-Fi stuck is caused by a problem of a network from the terminal device to the router.

It is to be understood that the data transmission method provided in some embodiments of the present disclosure is applicable to a device with data transmission capabilities, the device may be a terminal device and/or a server, and the data transmission method may be stored in the terminal device and the server in the form of an application. The terminal device and the server respectively execute respective corresponding applications to exchange data, to implement the data transmission method provided in the embodiments of the present disclosure, thereby implementing a function of the target application running on the terminal device. The application may be developed based on a client/server (C/S) architecture, or may be developed based on a browser/server (B/S) architecture. The application may be an independent application, or may be a functional module, a plug-in, an applet, or the like integrated in another application.

A data transmission system for which the data transmission method provided in some embodiments of the present disclosure is suitable is described below with reference to an actual application scenario.

FIG. 1 is a schematic diagram of an application scenario of a data transmission method according to an embodiment of the present disclosure. The data transmission method is suitable for the data transmission system. As shown in FIG. 1, the data transmission system includes a terminal device 101, a first routing device 102, a second routing device 103, a proxy server 104, and an application server 105. Data is transmitted between the terminal device 101 and the first routing device 102 by using a network data channel, and data is transmitted between the terminal device 101 and the second routing device 103 by using a short-range wireless data channel, where the network data channel is another network data channel other than the short-range wireless data channel (briefly referred to as a non-short-range wireless data channel below). Both the first routing device 102 and the second routing device 103 can communicate with the proxy server 104 by using a network, and a network communication connection is established between the proxy server 104 and the application server 105. In some embodiments, the short-range wireless data channel relies on a communication standard with a communication range shorter/smaller than a communication range of the network data channel.

The terminal device 101 is configured to perform a data transmission method on a terminal device side according to an embodiment of the present disclosure, and meanwhile, transmit an application packet generated during running of a target application to the application server 105 by using the non-short-range wireless data channel and the short-range wireless data channel. The proxy server 104 is configured to perform a data transmission method on a proxy server side according to an embodiment of the present disclosure, and meanwhile, transmit a reply packet generated by the application server 105 to the terminal device 101 by using the non-short-range wireless data channel and the short-range wireless data channel.

In some embodiments, a target application runs on the terminal device 101, and during running, the target application needs to exchange data with the application server 105 corresponding to the target application. After obtaining an application packet generated during the running of the target application, the terminal device 101 transmits the application packet to the first routing device 102 by using the non-short-range wireless data channel, and then the first routing device 102 transmits the application packet to the proxy server 104. Meanwhile, the terminal device 101 further transmits the application packet to the second routing device 103 by using the short-range wireless data channel, and then the second routing device 103 transmits the application packet to the proxy server 104. After receiving the application packets from the first routing device 102 and the second routing device 103, the proxy server 104 selects an application packet from the two application packets based on a deduplication mechanism, and transmits the application packet to the application server 105.

After receiving the application packet, the application server 105 correspondingly generates a reply packet corresponding to the application packet, and transmits the reply packet to the proxy server 104. The proxy server 104 respectively transmits the reply packet to the first routing device 102 and the second routing device 103. The first routing device 102 transmits the reply packet to the terminal device 101 by using the non-short-range wireless data channel, and the second routing device 103 transmits the reply packet to the terminal device 101 by using the short-range wireless data channel. After receiving the reply packets from the first routing device 102 and the second routing device 103, the terminal device 101 selects a reply packet from the two reply packets based on the deduplication mechanism, and transmits the reply packet to the target application.

In an actual application, the target application may be any application that runs on the terminal device and has a high stability requirement for a network environment, for example, a game application or a payment application.

It is to be understood that the short-range wireless data channel may be specifically a Bluetooth data channel, or a near field communication (NFC) data channel, or may certainly be another wireless data channel that can implement short-range communication. The Bluetooth data channel refers to a data channel established based on a Bluetooth communication protocol channel, and the NFC data channel refers to a data channel established based on an NFC protocol channel.

It is to be understood that, in an actual application, the first routing device 102 and the second routing device 103 may be two independent routing devices, or may be the same routing device, and the routing device can receive a packet transmitted by using the non-short-range wireless data channel, and can further receive a packet transmitted by using the short-range wireless data channel.

It is to be understood that, in an actual application, the proxy server 104 and the application server 105 may be two independent servers, or may be the same server, and the server can generate a reply packet in response to a received application packet, and can further transmit the reply packet to the first routing device 102 and the second routing device 103 respectively.

Most routing devices in the related art cannot directly transmit data to a routing device by using the short-range wireless data channel. Therefore, in an actual application, a data transit device may be added to the data transmission system shown in FIG. 1. When the short-range wireless data channel is a Bluetooth data channel, the data transit device may be specifically a Bluetooth transit device. The Bluetooth transit device may establish a Bluetooth data channel with the terminal device 101 in a manner of Bluetooth pairing, and the Bluetooth transit device may further transmit data with the second routing device 103 by using another non-short-range wireless data channel. In this way, the terminal device 101 may first transmit a packet to the Bluetooth transit device by using the Bluetooth data channel, and then the Bluetooth transit device transmits the packet to the second routing device 103.

In the data transmission system shown in FIG. 1, the short-range wireless data channel is used to assist the non-short-range wireless data channel for data transmission, reducing the occurrence of packet loss during data transmission. Moreover, when a state of the non-short-range wireless data channel is not good, the short-range wireless data channel may be used to accelerate the transmission of the packet, reducing data transmission latency.

It is to be understood that the application scenario shown in FIG. 1 is only an example. In an actual application, the data transmission method provided in some embodiments of the present disclosure is further applicable to another application scenario, and an application scenario of the data transmission method is not limited herein.

The following first describes, through embodiments, a data transmission method on a terminal device side provided in the present disclosure.

Figure 2:
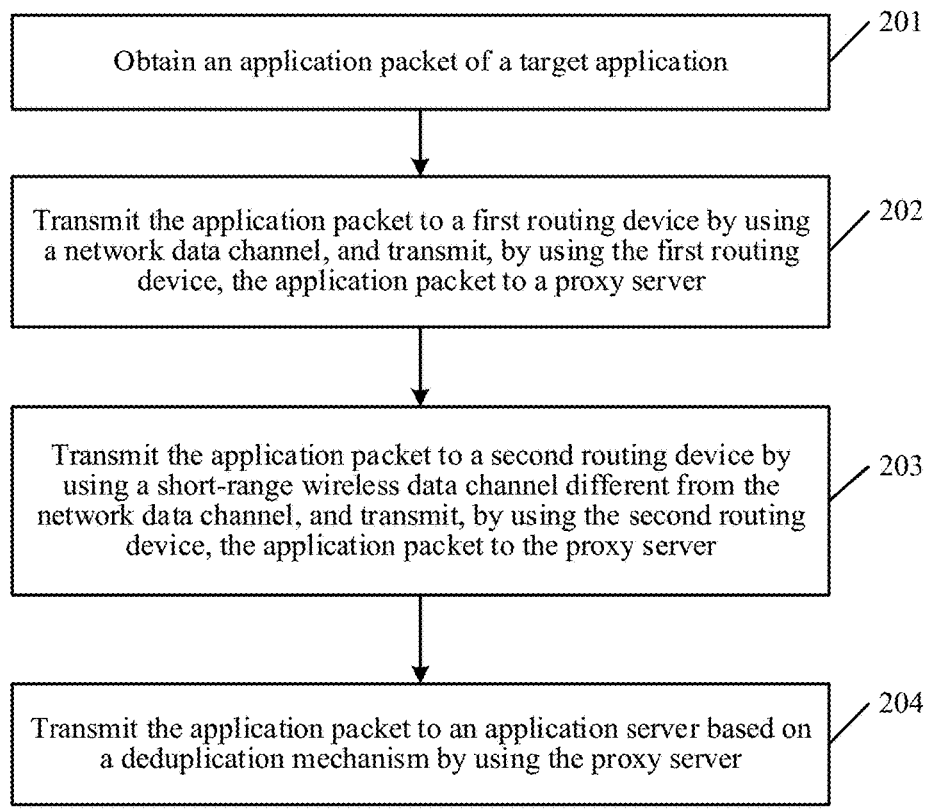
FIG. 2 is a schematic flowchart of a data transmission method on a terminal device side according to an embodiment of the present disclosure.

FIG. 2 is a schematic flowchart of a data transmission method on a terminal device side according to an embodiment of the present disclosure. The data transmission method is applicable to a terminal device in the form of an application, a plug-in, or the like. For ease of description, the data transmission method is only described in the form of an application below, and the application that implements the data transmission method is briefly referred to as an acceleration application (APP) below. As shown in FIG. 2, the method includes the following steps:

Step 201: Obtain an application packet of a target application.

The target application refers to an application that needs accelerated data transmission. The so-called accelerated data transmission refers to a transmission requirement that the application requires the acceleration application (acceleration APP) to provide a more stable network environment for the application in a process of transmitting the application packet. For the application packet to be transmitted in the target application, the acceleration APP intercepts and obtains the application packet, and then transmits the application packet by using a network data channel and a short-range wireless data channel respectively. The short-range wireless data channel is used as an auxiliary channel of the network data channel, so that one more network transmission channel is used to transmit data, thereby providing a smoother network environment for the target application, meeting the accelerated transmission requirement of the target application, and achieving a technical effect of reducing network latency and service packet loss.

In an actual application, the acceleration APP may start a virtual private network (VPN) service of the terminal device, and intercept and obtain, by using the VPN service, an application packet generated during running of the target application. Certainly, the acceleration APP may alternatively obtain the application packet in another manner, and a manner of obtaining the application packet is not limited herein.

It is to be understood that the target application may be an application that needs to frequently exchange data with the server, for example, a player VS player game application. Certainly, the target application may alternatively be another type of application, and the target application is not specifically limited herein. In actual implementation, a system of the terminal device may set, by default, all installed applications as target applications that need accelerated transmission, or may selectively set specific types of applications as target applications that need accelerated transmission. For example, the acceleration APP may set game applications as target applications by default.

Certainly, to ensure that usage requirements of the user are met, a target application setting channel may be alternatively provided for the user, for the user to customize target applications that need accelerated transmission. For example, in an actual application, the acceleration APP provides the user with an application configuration interface. The application configuration interface carries configuration controls, for the user to select an application that needs accelerated transmission as a target application. The user may trigger an application selection operation on the application configuration interface, and the acceleration APP uses an application selected by the user as the target application.

In a configuration process, one application may be set as the target application, or a plurality of applications may be all set as target applications.

In an actual application, an option that needs to be accelerated may be alternatively added to a configurable item of each application, and the user sets a specific application as the target application. In this way, the acceleration APP may determine, according to a function attribute value of each application, whether the application needs to be accelerated and whether the application is the target application. Then the terminal device monitors an application packet of each application during running, uses the data transmission method provided in the present disclosure only for an application packet generated during the running of the target application, and transmits the application packet by using a plurality of network data channels.

In an example, the acceleration APP may display the application configuration interface to the user by using the terminal device. Correspondingly, the user may select one or more applications in the terminal device as the target application by using the application configuration interface. For example, the terminal device may display applications whose running is currently supported by the terminal device to the user in the form of an application list, and correspondingly configure a selection control for each application. By touching a selection control, the user may correspondingly set an application corresponding to the selection control as the target application. It is to be understood that the foregoing manner of selecting the target application is only an example. In an actual application, the terminal device may further support another manner of selecting the target application, and the manner of selecting the target application is not limited herein.

The acceleration APP detects a target application selection operation triggered by the user by using the application configuration interface, which is equivalent to receiving an application selection instruction inputted by the user by using the application configuration interface. Then the acceleration APP sets an application selected by the user as the target application according to the application selection instruction. Specifically, the acceleration APP may set an application as the target application by adding an identifier to the application, or the acceleration APP may set the application as the target application by adding the identifier of the application to a target application list, and a manner in which the terminal device records an application as the target application is not limited herein.

Correspondingly, before transmitting the application packet, the acceleration APP may determine, according to a source identifier of the application packet, a manner for transmitting the application packet. Specifically, the acceleration APP may determine, according to the source identifier of the application packet, whether the application packet comes from the target application that is set by the user. If yes, steps 202 and 203 are performed, that is, the application packet is transmitted by using the network data channel and the short-range wireless data channel respectively; otherwise, if the application packet does not come from the target application that is set by the user, only step 202 is performed, that is, the application packet is transmitted by using the network data channel only.

It is to be understood that the source identifier of the application packet can represent an application from which the application packet is generated. Correspondingly, the acceleration APP can determine, based on the source identifier of the application packet, whether the application packet is generated from the target application.

Step 202: Transmit the application packet to a first routing device by using a network data channel, and transmit, by using the first routing device, the application packet to a proxy server.

After obtaining the application packet generated during running of the target application, the acceleration APP transmits the application packet to the first routing device by using the network data channel, to further transmit the application packet to the proxy server by using the first routing device.

The network data channel may be any network data channel other than the short-range wireless data channel, for example, a Wi-Fi network data channel, a cellular network data channel, or a wired network data channel, and a type of the network data channel is not limited herein.

In addition, a network data channel between the first routing device and the proxy server may also be any one of the Wi-Fi network data channel, the cellular network data channel, and the wired network data channel, and a type of the network data channel between the first routing device and the proxy server is not limited herein either.

It is to be understood that in an actual application, many users usually preferentially select the Wi-Fi network channel as the network data channel considering traffic accounting. Certainly, when the Wi-Fi network channel cannot be constructed or a state of the Wi-Fi network channel is relatively poor, the user may alternatively select the cellular network data channel as the network data channel. In other words, the user may select any network data channel according to actual requirements thereof.

Step 203: Transmit the application packet to a second routing device by using a short-range wireless data channel different from the network data channel, and transmit, by using the second routing device, the application packet to the proxy server.

While transmitting the application packet generated during running of the target application by using the network data channel, the acceleration APP further transmits the application packet to the second routing device by using the short-range wireless data channel, to transmit the application packet to the proxy server by using the second routing device.

The short-range wireless data channel and the network data channel are of different types. The short-range wireless data channel may be a Bluetooth data channel or an NFC data channel, where the Bluetooth data channel may be a network data transmission channel established based on a Bluetooth channel, or may be an original Bluetooth data transmission channel; and the NFC data channel may be a network data transmission channel established based on an NFC channel, or may be an original NFC data transmission channel.

In addition, a network data channel between the second routing device and the proxy server may be any one of the Wi-Fi network data channel, the cellular network data channel, and the wired network data channel, and a type of the network data channel between the second routing device and the proxy server is not limited herein.

It is to be understood that, in an actual application, the first routing device and the second routing device may be two independent routing devices, or may be the same routing device. When the second routing device and the first routing device are the same routing device, the routing device can simultaneously support transmission mechanisms of two data transmission channels, where one is a short-range wireless data channel such as a Bluetooth data channel or an NFC data channel, and the other may be a non-short-range wireless data channel such as a Wi-Fi network data channel or a cellular network data channel.

For different types of short-range wireless data channels, data transmission methods respectively corresponding to the short-range wireless data channels are described below.

In one implementation, the short-range wireless data channel may be a wireless network established in attachment to an original Bluetooth channel, that is, the short-range wireless data channel may be a Bluetooth wireless local area network (BT-WLAN) channel. Correspondingly, the acceleration APP may transmit the application packet to a Bluetooth transit device by using the BT-WLAN channel, and then the Bluetooth transit device transmits the application packet to the second routing device.

In an actual application, because most routing devices cannot directly transmit data based on the BT-WLAN channel, it is usually difficult for the terminal device to directly construct the BT-WLAN channel between the terminal device and the second routing device. To enable the terminal device to transmit data based on the BT-WLAN channel, a Bluetooth transit device usually needs to be added between the terminal device and the second routing device. The Bluetooth transit device is used to receive the application packet transmitted by the terminal device by using the BT-WLAN channel, and then the Bluetooth transit device is used to transmit the received application packet to the second routing device by using another non-short-range wireless data channel.

In actual implementation, the terminal device may first be connected to the Bluetooth transit device in the manner of Bluetooth pairing, to establish an original Bluetooth channel between the terminal device and the Bluetooth transit device. Then the terminal device and the Bluetooth transit device may use a function of a Bluetooth local area network to create a wireless network channel based on the original Bluetooth channel, that is, establish a BT-WLAN channel between the terminal device and the Bluetooth transit device. After the BT-WLAN channel is created, the acceleration APP may transmit, after obtaining the to-be-transmitted application packet in the target application, the application packet to the Bluetooth transit device by using the BT-WLAN channel, and then transmit the application packet to the second routing device by using the Bluetooth transit device.

Correspondingly, when the application server transmits the reply packet to the target application by using the proxy server, the application server may transmit the reply packet to the second routing device by using the proxy server, and then the second routing device transmits the reply packet to the Bluetooth transit device. Then, the Bluetooth transit device transmits the reply packet to the acceleration APP by using the BT-WLAN channel, and the acceleration APP transmits the reply packet to the target application.

It is to be understood that the Bluetooth transit device may be any device with a Bluetooth function and a data transmission function, for example, a smartphone or a tablet computer, and the Bluetooth transit device is not limited herein.

It is generally believed in the industry that the application of the BT-WLAN needs to use 4G as a hotspot source, but if 4G is still used as a hotspot source for Bluetooth to assist Wi-Fi, problems of traffic consumption and high power consumption are inevitably caused, so the BT-WLAN will not be used for Wi-Fi acceleration. However, the inventor finds through experiments that the BT-WLAN may also use Wi-Fi as a hotspot source, so that Bluetooth can be directly used to assist Wi-Fi, thereby reducing power consumption.

In another implementation, the short-range wireless data channel may be an original BT channel, and the original BT channel usually only supports transmission of data in a Bluetooth format (briefly referred to as Bluetooth data below). Correspondingly, before transmitting an application packet, the acceleration APP needs to first convert the application packet into a corresponding Bluetooth packet, and then transmit the Bluetooth packet to the Bluetooth transit device by using the original BT channel. The Bluetooth transit device converts the Bluetooth packet back into an application packet, and then transmits the application packet to the second routing device.

In an actual application, because most routing devices cannot directly transmit data based on the original BT channel, it is usually difficult for the terminal device to directly construct an original BT channel between the terminal device and the second routing device. To enable the terminal device to transmit data based on the original BT channel, a Bluetooth transit device usually needs to be added between the terminal device and the second routing device. The Bluetooth transit device is used to receive the application packet transmitted by the terminal device by using the original BT channel, and then the Bluetooth transit device is used to transmit the received application packet to the second routing device by using another non-short-range wireless data channel.

In actual implementation, the terminal device may first be connected to the Bluetooth transit device in the manner of Bluetooth pairing, to establish the original BT channel between the terminal device and the Bluetooth transit device. After obtaining the application packet of the target application, the acceleration APP converts the application packet into the corresponding Bluetooth packet, and then invokes a Bluetooth interface of the terminal device to transmit the Bluetooth packet to the Bluetooth transit device by using the original BT channel. After receiving the Bluetooth packet, the Bluetooth transit device correspondingly converts the Bluetooth packet back into an application packet corresponding to the Bluetooth packet, and transmits the application packet to the second routing device.

Correspondingly, when the application server transmits the reply packet to the target application by using the proxy server, the application server may first transmit the reply packet to the second routing device by using the proxy server, and then transmits the reply packet to the Bluetooth transit device by using the second routing device. After receiving the reply packet, to ensure that the reply packet can be transmitted based on the original BT channel, the Bluetooth transit device first converts the reply packet into a Bluetooth reply packet corresponding to the reply packet, and then transmits the Bluetooth reply packet to the terminal device by using the original BT channel. The acceleration APP in the terminal device correspondingly converts the Bluetooth reply packet back into a reply packet corresponding to the Bluetooth reply packet, and transmits the reply packet to the target application.

In addition to the Bluetooth function and the data transmission function, the Bluetooth transit device in this implementation further needs to have a data conversion function, that is, the Bluetooth transit device can implement mutual conversion between traffic data (that is, types of data corresponding to the application packet and the reply packet) and Bluetooth data (that is, types of data corresponding to the Bluetooth packet and the Bluetooth reply packet).

In some implementations, the Bluetooth transit device may be a customized Bluetooth device, that is, a device that has the Bluetooth function, the data transmission function, and the data conversion function simultaneously may be pre-customized, and the device is used to transit a packet transmitted between the terminal device and the second routing device.

In some implementations, because the acceleration APP can implement the mutual conversion between the traffic data and the Bluetooth data, the acceleration APP may be directly installed on a terminal device with the Bluetooth function and the data transmission function. The terminal device is used as a Bluetooth transit device, to transit a packet between the terminal device on which the target application runs and the second routing device.

In another implementation, to reduce a quantity of devices that need to be passed during data transmission, an original BT channel may be directly constructed between the terminal device and the second routing device. Correspondingly, before transmitting an application packet, the acceleration APP needs to convert the application packet into a corresponding Bluetooth packet, and then transmit the Bluetooth packet to the second routing device by using the original BT channel. Then, the second routing device converts the Bluetooth packet into an application packet.

As described above, in the related art, most routing devices cannot directly transmit data based on the original BT channel. Therefore, to enable the second routing device to receive, by using the original BT channel, the Bluetooth packet transmitted by the terminal device, specific processing usually needs to be performed on the second routing device in advance. In some embodiments, a Bluetooth module may be added to the second routing device, and the Bluetooth module is used to obtain the Bluetooth data and implement the mutual conversion between the Bluetooth data and the traffic data.

In actual implementation, the terminal device may first be connected to the second routing device in the manner of Bluetooth pairing, to establish the original BT channel between the terminal device and the second routing device. After obtaining the application packet of the target application, the acceleration APP converts the application packet into the corresponding Bluetooth packet, and then invokes a Bluetooth interface of the terminal device to transmit the Bluetooth packet to the second routing device by using the original BT channel. After receiving the Bluetooth packet, the second routing device correspondingly converts the Bluetooth packet back into an application packet corresponding to the Bluetooth packet, and transmits the application packet to the proxy server.

Correspondingly, when the application server transmits the reply packet to the target application by using the proxy server, the application server may first transmit the reply packet to the second routing device by using the proxy server. To ensure that the reply packet can be transmitted based on the original BT channel, the second routing device may first convert the reply packet into a Bluetooth reply packet corresponding to the reply packet, and then transmits the Bluetooth reply packet to the terminal device by using the original BT channel. The acceleration APP in the terminal device correspondingly converts the Bluetooth reply packet back into a reply packet corresponding to the Bluetooth reply packet, and transmits the reply packet to the target application.

It is to be understood that in an actual application, in addition to transmitting the application packet to the second routing device based on the BT-WLAN channel or the original BT channel through the foregoing three possible implementations, the terminal device may further transmit the application packet to the second routing device by using a data channel constructed based on an NFC channel, for example, a near field communication wireless local area network (NFC-WLAN) channel, or an original NFC channel, and a short-range wireless data channel used is not limited herein. It is to be understood that when the terminal device transmits the application packet to the second routing device based on an NFC-WLAN data channel, an NFC transit device may be added between the terminal device and the second routing device, so that the terminal device may transmit the application packet to the NFC transit device by using the NFC-WLAN data channel. Then, the NFC transit device is used to transmit the application packet to the second routing device by using another non-short-range wireless data channel. When the terminal device transmits the application packet to the second routing device based on an original NFC data channel, an NFC transit device may be added between the terminal device and the second routing device. After converting the application packet into NFC data, the terminal device transmits the NFC data to the NFC transit device by using the original NFC data channel. Then, the NFC transit device converts the NFC data back into an application packet, and transmits the application packet to the second routing device by using another non-short-range wireless data channel. Certainly, an NFC module may be added to the second routing device, so that the terminal device may directly transmit the NFC data to the second routing device after converting the application packet into the NFC data, and convert the NFC data back into the application packet by using the second routing device.

The foregoing steps 202 and 203 may be performed simultaneously, and are not in a particular sequence in an actual application. In other words, after obtaining the application packet generated during running of the target application, the acceleration APP transmits the application packet to the first routing device and the second routing device simultaneously by using the network data channel and the short-range wireless data channel, and then transmits the application packet to the proxy server by using the first routing device and the second routing device respectively.

Step 204: Transmit the application packet to an application server based on a deduplication mechanism by using the proxy server.

After receiving the application packets transmitted from the first routing device and the second routing device, the proxy server selects, based on the deduplication mechanism, an application packet from the application packets transmitted from the first routing device and the second routing device, and transmits the application packet to the application server, for the application server to perform corresponding processing based on the application packet.

In some embodiments, before transmitting the application packet by using the network data channel and the short-range wireless data channel, the acceleration APP sets the same identifier for the same application packets, for example, sets the same sequence number in headers of the application packets. A speed of transmitting the application packet via a transmission path of the network data channel and the first routing device (briefly referred to as a first transmission path) is usually different from a speed of transmitting the application packet via a transmission path of the short-range wireless data channel and the second routing device (briefly referred to as a second transmission path). Therefore, the proxy server usually receives two identical application packets successively. To prevent the application server from repeating the same processing procedure for the two identical application packets subsequently and wasting computing resources, after receiving an application packet, the proxy server determines, according to an identifier of the received current application packet, whether the proxy server has received a previous application packet the same as the current application packet before. If yes, the proxy server may directly discard the application packet; if not, the application packet is transmitted to the application server.

Similarly, when the application server transmits a reply packet to the target application by using the proxy server, the proxy server also sets the same identifier for the same reply packets. The proxy server transmits the reply packet to the acceleration APP in the terminal device by using the foregoing first transmission path and second transmission path respectively. Because the transmission speeds of the first transmission path and the second transmission path are usually different, the acceleration APP usually receives two identical reply packets successively. To prevent the target application from repeating the same processing procedure for the two identical reply packets subsequently and wasting computing resources, after receiving a reply packet, the acceleration APP determines, according to an identifier of the received reply packet, whether the proxy server has received a reply packet the same as the reply packet before. If yes, the acceleration APP may directly discard the reply packet; if not, the reply packet is transmitted to the target application. In other words, for each currently received reply packet, the current reply packet is discarded when the current reply packet is the same as a previous reply packet received before the current reply packet is received; and the current reply packet is sent to the target application when no previous reply packet is found to be the same as the current reply packet.

According to the foregoing data transmission method, a short-range wireless data channel (for example, a Bluetooth data channel or an NFC data channel) is used as an auxiliary channel for data transmission, and the auxiliary channel is used to assist another non-short-range wireless data channel (for example, a Wi-Fi data channel or a cellular network data channel) for data transmission. In this way, data transmission is performed based on a plurality of data channels, ensuring the stability and reliability of data transmission. In addition, because the short-range wireless data channel requires less power to transmit data, power consumption and heat emission of the terminal device can be reduced as much as possible while ensuring stable data transmission.

Next, the following describes, through embodiments, a data transmission method on a proxy server side provided in the present disclosure.

Figure 3:
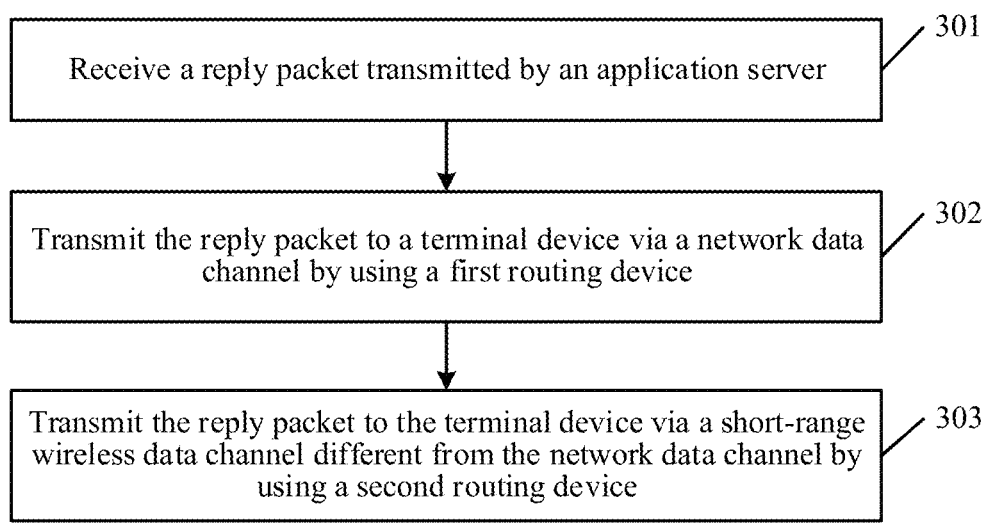
FIG. 3 is a schematic flowchart of a data transmission method on a proxy server side according to an embodiment of the present disclosure.

FIG. 3 is a schematic flowchart of a data transmission method on a proxy server side according to an embodiment of the present disclosure. As shown in FIG. 3, the method includes the following steps:

Step 301: Receive a reply packet transmitted by an application server.

After receiving an application packet transmitted by a target application, the application server correspondingly generates a reply packet in response to the application packet, and transmits the reply packet to the proxy server, to replicate the reply packet into two copies by using the proxy server, and transmit the reply packets to a terminal device via a path corresponding to a first routing device and a network data channel and a path corresponding to a second routing device and a short-range wireless data channel respectively.

Step 302: Transmit the reply packet to a terminal device via a network data channel by using a first routing device.

After receiving the reply packet transmitted by the application server, the proxy server transmits the reply packet to the first routing device, to transmit the reply packet to the terminal device via a first network data channel by using the first routing device.

A network data channel between the proxy server and the first routing device may be any one of the Wi-Fi network data channel, the cellular network data channel, and the wired network data channel, and a type of the first network data channel between the first routing device and the proxy server is not specifically limited herein. The first network data channel may be specifically any network data channel other than the short-range wireless data channel, for example, a Wi-Fi network data channel, a cellular network data channel, or a wired network data channel, and a type of the first network data channel is not specifically limited herein either.

Step 303: Transmit the reply packet to the terminal device via a short-range wireless data channel different from the network data channel by using a second routing device.

While transmitting the reply packet via the first network data channel by using the first routing device, the proxy server further transmits the replicated reply packet to the second routing device, to transmit the reply packet to the terminal device via the short-range wireless data channel by using the second routing device.

In some embodiments, a network data channel between the proxy server and the second routing device may be any one of the Wi-Fi network data channel, the cellular network data channel, and the wired network data channel, and a type of the network data channel between the second routing device and the proxy server is not specifically limited herein. In addition, a second network data channel and the first network data channel are of different types. The second network data channel is a short-range wireless data channel. Specifically, the second network data channel may be a Bluetooth data channel, for example, a network data transmission channel established based on a Bluetooth channel, or an original Bluetooth data transmission channel. The second network data channel may alternatively be an NFC data channel, for example, a network data transmission channel established based on an NFC channel, or an original NFC data transmission channel.

When the second network data channel, namely, a short-range wireless data channel is a BT-WLAN channel, the proxy server may first transmit the reply packet to the second routing device, and then the second routing device transmits the reply packet to the Bluetooth transit device. Then, the Bluetooth transit device transmits the reply packet to an acceleration APP in the terminal device by using the BT-WLAN channel, and the acceleration APP transmits the reply packet to the target application.

In some embodiments, the short-range wireless data channel is an original BT channel, the proxy server first transmits the reply packet to the second routing device, and then the second routing device transmits the reply packet to the Bluetooth transit device. Then, the Bluetooth transit device converts the reply packet into a Bluetooth reply packet, and transmits the Bluetooth reply packet to the acceleration APP in the terminal device by using the original BT channel. Finally, the acceleration APP converts the Bluetooth reply packet back into the corresponding reply packet, and transmits the reply packet to the target application.

In some embodiments, the short-range wireless data channel is an original BT channel, the proxy server first transmits the reply packet to the second routing device, and then the second routing device converts the reply packet into the Bluetooth reply packet, and transmits the Bluetooth reply packet to the acceleration APP in the terminal device by using the original BT channel. Finally, the acceleration APP converts the Bluetooth reply packet back into the corresponding reply packet, and transmits the reply packet to the target application.

With the application of the foregoing embodiments of the present disclosure, the network data channel and the short-range wireless data channel are used for data transmission. The short-range wireless data channel (for example, a Bluetooth data channel or an NFC data channel) is used as an auxiliary channel for data transmission, to assist the network data channel (for example, a Wi-Fi data channel or a cellular network data channel) for data transmission. In this way, data transmission is performed based on a plurality of data channels, ensuring the stability and reliability of data transmission, and improving data transmission efficiency.

To facilitate the overall understanding of the data transmission methods shown in FIG. 2 and FIG. 3, the following describes the data transmission methods provided in the embodiments of the present disclosure from the perspective of interaction between a terminal device and a server.

Figure 4:
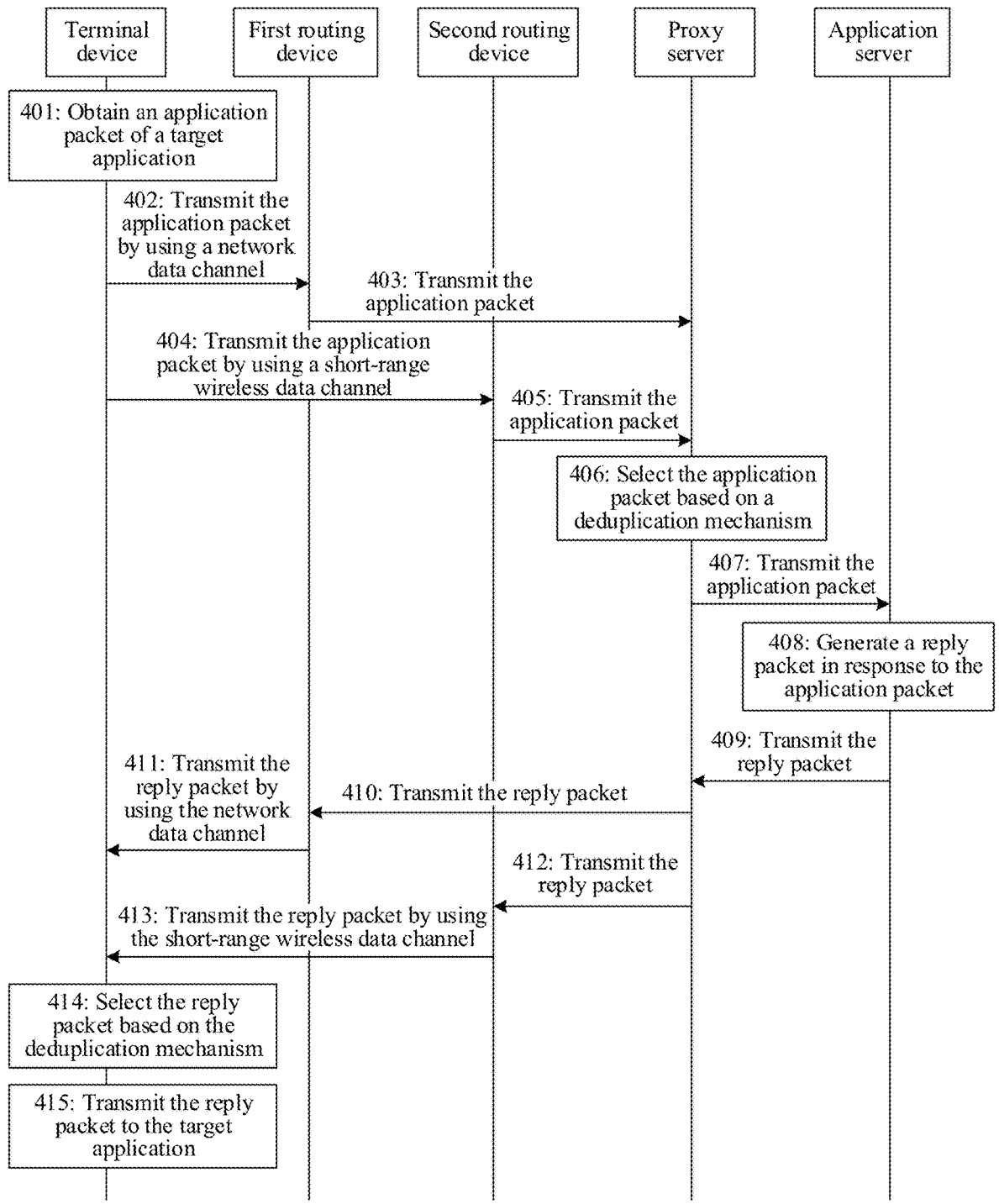
FIG. 4 is a signaling interaction diagram of a data transmission method according to an embodiment of the present disclosure.

FIG. 4 is a signaling interaction diagram of a data transmission method according to an embodiment of the present disclosure. As shown in FIG. 4, the data transmission method includes the following steps:

Step 401: A terminal device obtain an application packet of a target application.

The target application is usually an application that needs to frequently communicate with the server, for example, a player VS player game application or a payment application.

After obtaining the application packet, the terminal device triggers the performing of steps 402 and 404 simultaneously.

Step 402: The terminal device transmits the application packet to a first routing device by using a network data channel.

The network data channel is another data channel other than a short-range wireless data channel, for example, a Wi-Fi data channel, a cellular network data channel, or a wired network data channel.

Step 403: The first routing device transmits the application packet to a proxy server.

Step 404: The terminal device transmits the application packet to a second routing device by using a short-range wireless data channel.

The short-range wireless data channel may be a Bluetooth data channel or an NFC data channel. The Bluetooth data channel may be a BT-WLAN channel or an original BT channel, and the NFC data channel may be an NFC-WLAN channel or an original NFC channel.

Step 405: The second routing device transmits the application packet to the proxy server.

Step 406: The proxy server selects the application packet based on a deduplication mechanism.

In an actual application, the proxy server selects, based on the deduplication mechanism, an application packet from the application packets transmitted by the first routing device and the second routing device.

In some embodiments, according to a receiving sequence, the proxy server may select an application packet received by the proxy server first, and discard an application packet received by the proxy server later.

Step 407: The proxy server transmits the application packet to an application server.

Step 408: The application server generates a reply packet in response to the application packet.

Step 409: The application server transmits the reply packet to the proxy server, so that the proxy server replicates the reply packet after receiving the reply packet, and triggers the performing of steps 410 and 412.

Step 410: The proxy server transmits the reply packet to the first routing device.

Step 411: The first routing device transmits the reply packet to the terminal device by using the network data channel.

Step 412: The proxy server transmits the reply packet to the second routing device.

Step 413: The second routing device transmits the reply packet to the terminal device by using the short-range wireless data channel.

Step 414: The terminal device selects the reply packet based on the deduplication mechanism.

In an actual application, the terminal device selects, based on the deduplication mechanism, a reply packet from the reply packets transmitted by the first routing device and the second routing device.

In some embodiments, according to a receiving sequence, the terminal device may select a reply packet received by the terminal device first, and discard a reply packet received by the terminal device later.

Step 415: The terminal device transmits the reply packet to the target application.

Figure 5:
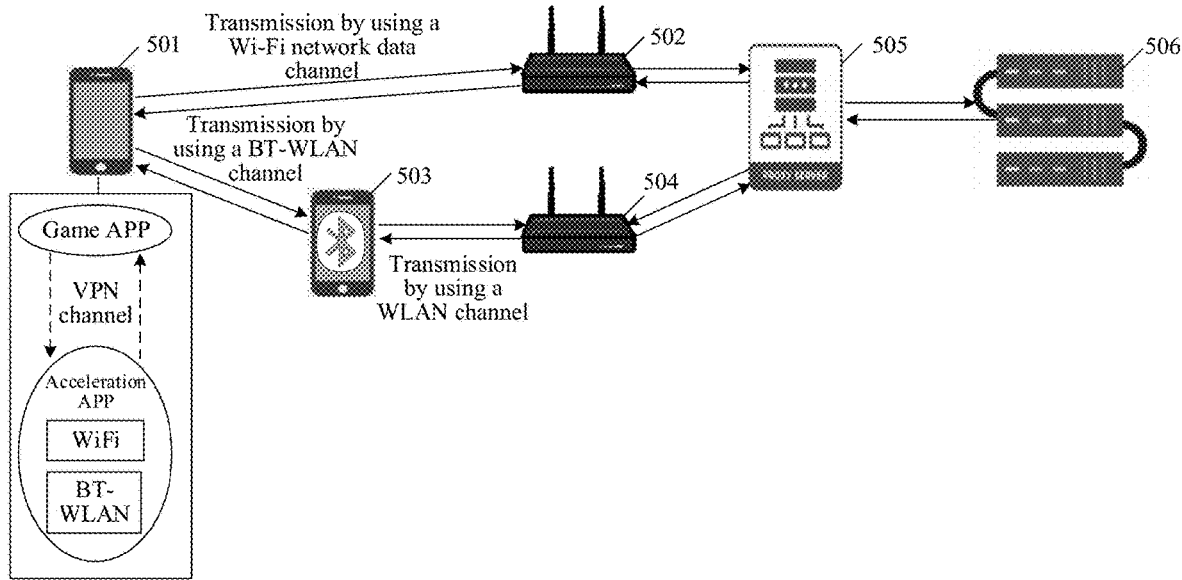
FIG. 5 is a schematic diagram of data transmission when a short-range wireless data channel is a BT-WLAN channel according to an embodiment of the present disclosure.
Figure 6:
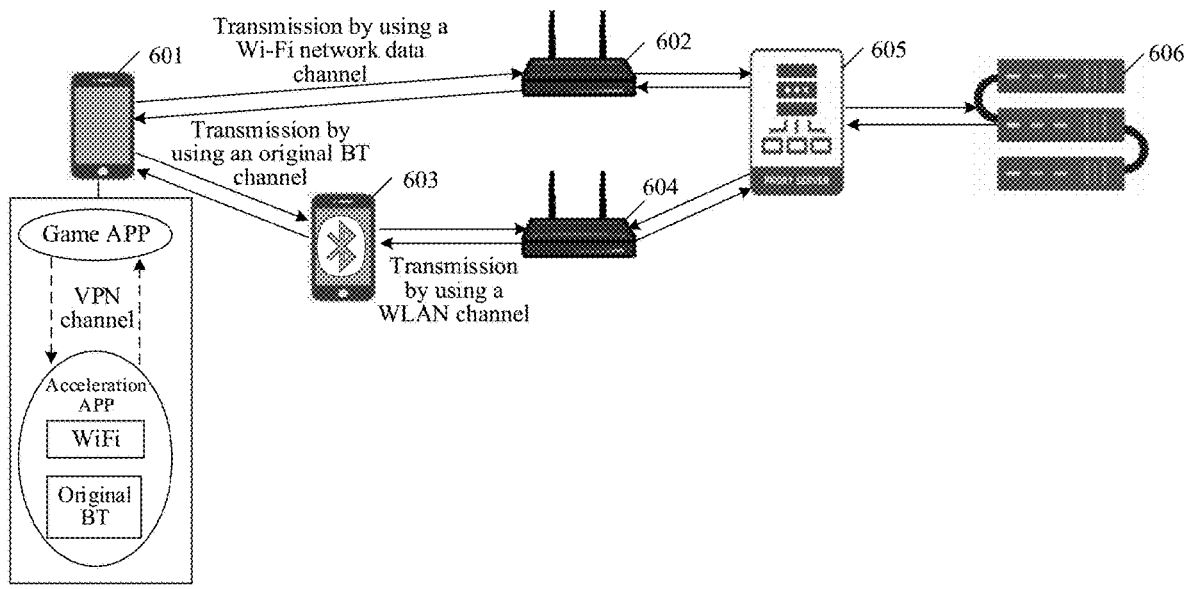
FIG. 6 is a schematic diagram of data transmission when a short-range wireless data channel is an original BT channel according to an embodiment of the present disclosure.
Figure 7:
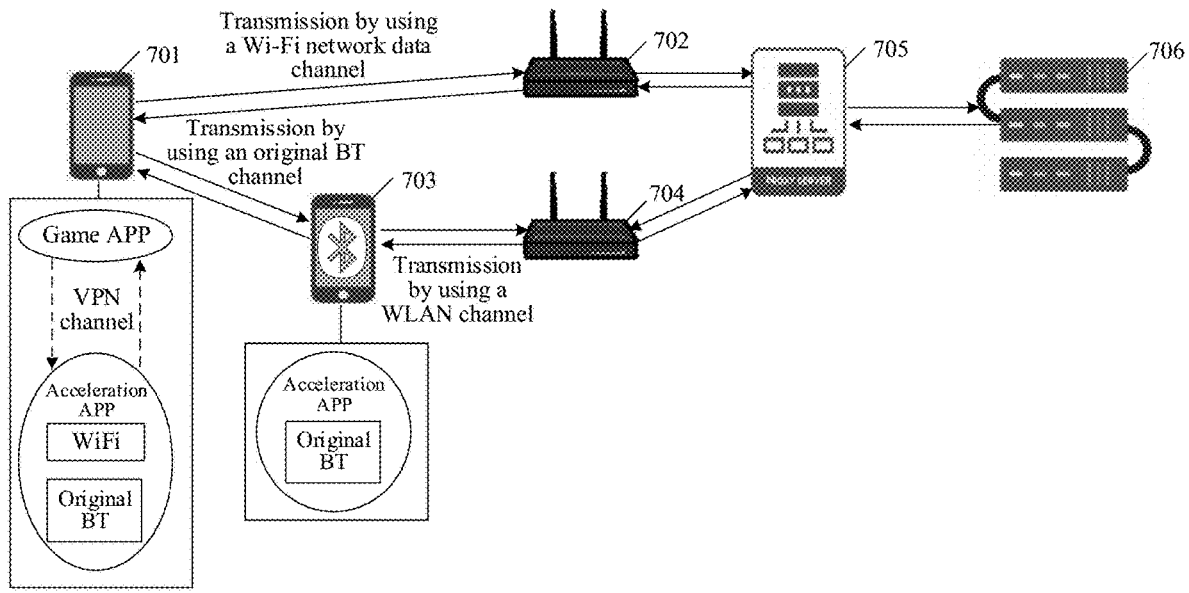
FIG. 7 is a schematic diagram of another data transmission when a short-range wireless data channel is an original BT channel according to an embodiment of the present disclosure.

The following uses an example in which the target application is a game APP, the network data channel is a Wi-Fi network data channel, and the short-range wireless data channel is a Bluetooth data channel, to describe the data transmission methods in the embodiments of the present disclosure with reference to FIG. 5, FIG. 6, and FIG. 7.

FIG. 5 is a schematic diagram of data transmission when a short-range wireless data channel is a BT-WLAN channel. As shown in FIG. 5, a game APP and an acceleration APP run on a terminal device 501, and the acceleration APP may intercept and obtain, by using a VPN channel, a game packet generated during running of the game APP. The acceleration APP may transmit the game packet to a first routing device 502 by using a Wi-Fi network data channel, and transmit the game packet to a second routing device 504 via a Bluetooth transit device 503 by using a BT-WLAN channel simultaneously. Then, the first routing device 502 and the second routing device 504 transmit the game packets received by the first routing device and the second routing device to a proxy server 505. According to a sequence of receiving the game packets, the proxy server 505 transmits a game packet received by the proxy server first to a game server 506, and discards a game packet received by the proxy server later.

The game server 506 correspondingly generates a reply packet in response to the game packet received by the game server, and transmits the reply packet to the proxy server 505. The proxy server 505 transmits the reply packet to the first routing device 502 and the second routing device 504 respectively, to transmit the reply packet to the acceleration APP via the Wi-Fi network data channel by using the first routing device 502, and transmit the reply packet to the acceleration APP through the BT-WLAN channel via the Bluetooth transit device 503 by using the second routing device 504. According to a sequence of receiving the reply packets, the acceleration APP transmits a reply packet received by the acceleration APP first to the game APP, and discards a reply packet received by the acceleration APP later.

FIG. 6 is a schematic diagram of data transmission when a short-range wireless data channel is an original BT channel. In the schematic diagram shown in FIG. 6, a Bluetooth transit device used for transiting a game packet is a customized Bluetooth device 603. The customized Bluetooth device can implement mutual conversion between traffic data and Bluetooth data.

As shown in FIG. 6, a game APP and an acceleration APP run on a terminal device 601, and the acceleration APP may intercept and obtain, by using a VPN channel, a game packet generated during running of the game APP. The acceleration APP may transmit the game packet to a first routing device 602 by using a Wi-Fi network data channel. Meanwhile, the acceleration APP may convert the game packet into a Bluetooth packet, and transmit the Bluetooth packet to the customized Bluetooth device 603 by using an original BT channel. After converting the Bluetooth packet back into a game packet, the customized Bluetooth device 603 transmits the game packet to a second routing device 604. The first routing device 602 and the second routing device 604 transmit the game packets received by the first routing device and the second routing device to a proxy server 605. According to a sequence of receiving the game packets, the proxy server 605 transmits a game packet received by the proxy server first to a game server 606, and discards a game packet received by the proxy server later.

The game server 606 correspondingly generates a reply packet in response to the game packet received by the game server, and transmits the reply packet to the proxy server 605. The proxy server 605 transmits the reply packet to the first routing device 602 and the second routing device 604 respectively, to transmit the reply packet to the acceleration APP via the Wi-Fi network data channel by using the first routing device 602, and transmit the reply packet to the customized Bluetooth device 603 by using the second routing device 604. The reply packet is converted into the Bluetooth reply packet by using the customized Bluetooth device 603, and the Bluetooth reply packet is transmitted to the acceleration APP by using the original BT channel. After receiving the Bluetooth reply packet, the acceleration APP correspondingly converts the Bluetooth reply packet into the reply packet. According to a sequence of obtaining the reply packets, the acceleration APP transmits a reply packet obtained by the acceleration APP first to the game APP, and discards a reply packet obtained by the acceleration APP later.

FIG. 7 is a schematic diagram of another data transmission when a short-range wireless data channel is an original BT channel. In the schematic diagram shown in FIG. 7, a Bluetooth transit device used for transiting a game packet is a terminal device 703. An acceleration APP that can implement mutual conversion between traffic data and Bluetooth data runs on the terminal device 703.

As shown in FIG. 7, a game APP and an acceleration APP run on a terminal device 701, and the acceleration APP may intercept and obtain, by using a VPN channel, a game packet generated during running of the game APP. The acceleration APP in the terminal device 701 may transmit the game packet to a first routing device 702 by using a Wi-Fi network data channel. Meanwhile, the acceleration APP in the terminal device 701 may convert the game packet into a Bluetooth packet, and transmit the Bluetooth packet to the acceleration APP in the terminal device 703 by using an original BT channel. After converting the Bluetooth packet back into a game packet, the acceleration APP in the terminal device 703 transmits the game packet to a second routing device 704. Then, the first routing device 702 and the second routing device 704 transmit the game packets received by the first routing device and the second routing device to a proxy server 705. According to a sequence of receiving the game packets, the proxy server 705 transmits a game packet received by the proxy server first to a game server 706, and discards a game packet received by the proxy server later.

The game server 706 correspondingly generates a reply packet in response to the game packet received by the game server, and transmits the reply packet to the proxy server 705. The proxy server 705 transmits the reply packet to the first routing device 702 and the second routing device 704 respectively, to transmit the reply packet to the acceleration APP via the Wi-Fi network data channel by using the first routing device 702, and transmit the reply packet to the acceleration APP in the terminal device 703 by using the second routing device 704. The reply packet is converted into the Bluetooth reply packet by using the acceleration APP in the terminal device 703, and the Bluetooth reply packet is transmitted to the acceleration APP in the terminal device 701 by using the original BT channel. After receiving the Bluetooth reply packet, the acceleration APP in the terminal device 701 correspondingly converts the Bluetooth reply packet into the reply packet. According to a sequence of obtaining the reply packets, the acceleration APP in the terminal device 701 transmits a reply packet obtained by the acceleration APP first to the game APP, and discards a reply packet obtained by the acceleration APP later.

The short-range wireless data channel in the present disclosure may alternatively be an NFC data channel. When the short-range wireless data channel is an NFC-WLAN channel, data transmission may be performed based on an implementation similar to that of FIG. 5. When the short-range wireless data channel is an original NFC channel, data transmission may be performed based on an implementation similar to that of FIG. 6 or FIG. 7.

For the data transmission methods described above, the present disclosure further provides corresponding data transmission apparatuses, so that the data transmission methods can be applied and implemented in practice.

Figure 8:
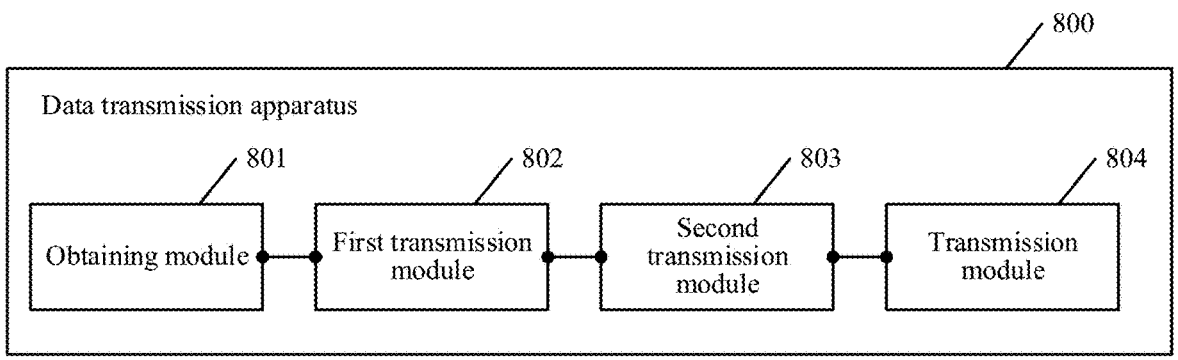
FIG. 8 is a schematic structural diagram of a first data transmission apparatus on a terminal device side according to an embodiment of the present disclosure.

FIG. 8 is a schematic structural diagram of a data transmission apparatus 800 corresponding to the foregoing data transmission method shown in FIG. 2. The data transmission apparatus 800 includes:

an obtaining module 801, configured to obtain an application packet of a target application;

a first transmission module 802, configured to transmit the application packet to a proxy server via a first routing device by using a network data channel;

a second transmission module 803, configured to transmit the application packet to the proxy server via a second routing device by using a short-range wireless data channel different from the network data channel; and a transmission module 804, configured to transmit the application packet to an application server corresponding to the target application based on a deduplication mechanism by using the proxy server.

In some implementations, on the basis of the data transmission apparatus shown in FIG. 8, the short-range wireless data channel is a BT-WLAN channel; and the second transmission module 803 is further configured to transmit, by using an BT-WLAN data channel established between the apparatus and a Bluetooth transit device, the application packet to the second routing device via the Bluetooth transit device.

In some implementations, on the basis of the data transmission apparatus shown in FIG. 8, the short-range wireless data channel is a BT data channel; and the second transmission module 803 is further configured to convert the application packet into a corresponding Bluetooth packet; and transmit the Bluetooth packet to a Bluetooth transit device by using the BT channel, so that the Bluetooth transit device converts the Bluetooth packet into the application packet, and transmits the application packet to the second routing device.

Figure 9:
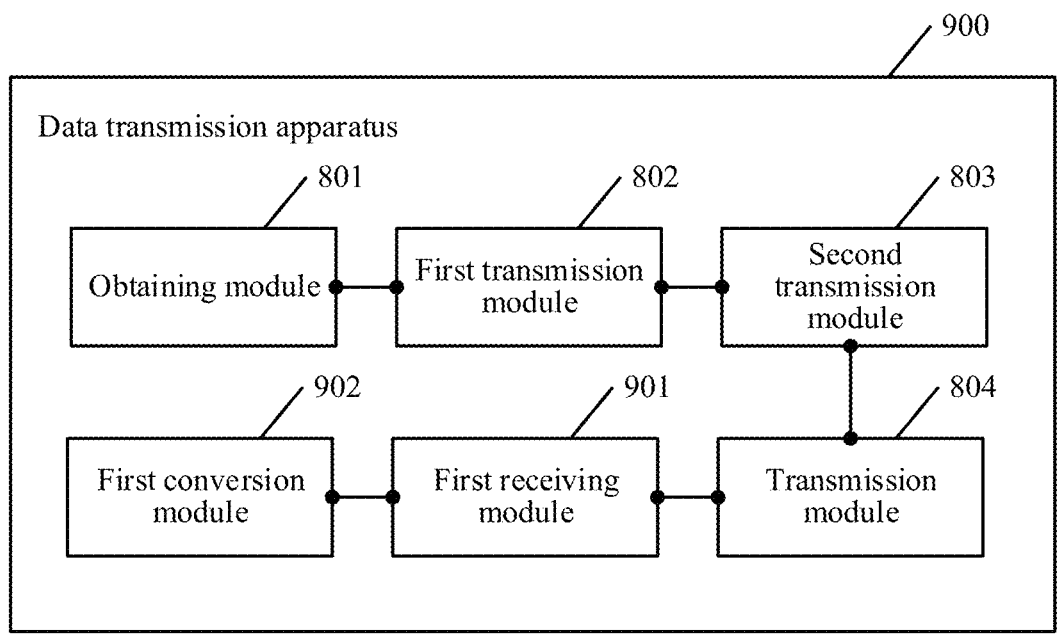
FIG. 9 is a schematic structural diagram of a second data transmission apparatus on a terminal device side according to an embodiment of the present disclosure.

In some implementations, on the basis of the data transmission apparatus shown in FIG. 8, FIG. 9 is a schematic structural diagram of another data transmission apparatus 900 according to an embodiment of the present disclosure. The data transmission apparatus 900 further includes:

a first receiving module 901, configured to receive a Bluetooth reply packet transmitted by the Bluetooth transit device, the Bluetooth reply packet being generated by converting a reply packet by the Bluetooth transit device, the reply packet being a packet returned by the application server via the proxy server and the second routing device in response to the application packet; and
 a first conversion module 902, configured to convert the Bluetooth reply packet into the reply packet, and transmit the reply packet to the target application.

In some implementations, on the basis of the data transmission apparatus shown in FIG. 8, the short-range wireless data channel is a BT channel; and the second transmission module 803 is further configured to convert the application packet into a corresponding Bluetooth packet; and
 transmit the Bluetooth packet to the second routing device by using the BT channel, so that the second routing device converts the Bluetooth packet into the application packet.

Figure 10:
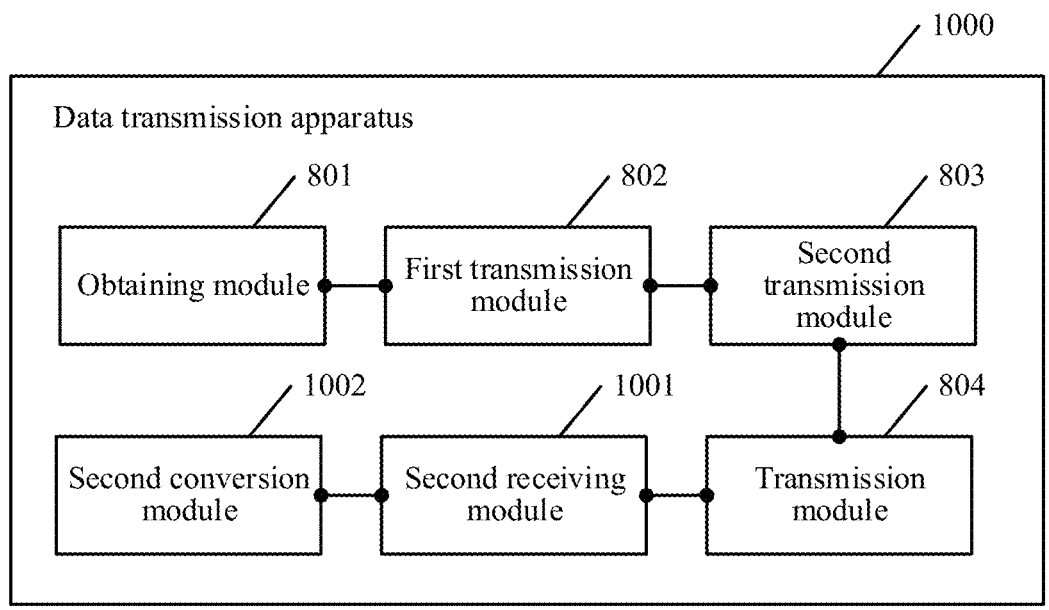
FIG. 10 is a schematic structural diagram of a third data transmission apparatus on a terminal device side according to an embodiment of the present disclosure.

In some implementations, on the basis of the data transmission apparatus shown in FIG. 8, FIG. 10 is a schematic structural diagram of another data transmission apparatus 1000 according to an embodiment of the present disclosure. The data transmission apparatus 1000 further includes:

a second receiving module 1001, configured to receive a Bluetooth reply packet transmitted by the second routing device, the Bluetooth reply packet being generated by converting a reply packet by the second routing device, the reply packet being a packet returned by the application server via the proxy server in response to the application packet; and
 a second conversion module 1002, configured to convert the Bluetooth reply packet into the reply packet, and transmit the reply packet to the target application.

In some implementations, on the basis of the data transmission apparatus shown in FIG. 8, the network data channel includes any one of the following: a Wi-Fi network data channel, a cellular network data channel, and a wired network data channel.

Figure 11:
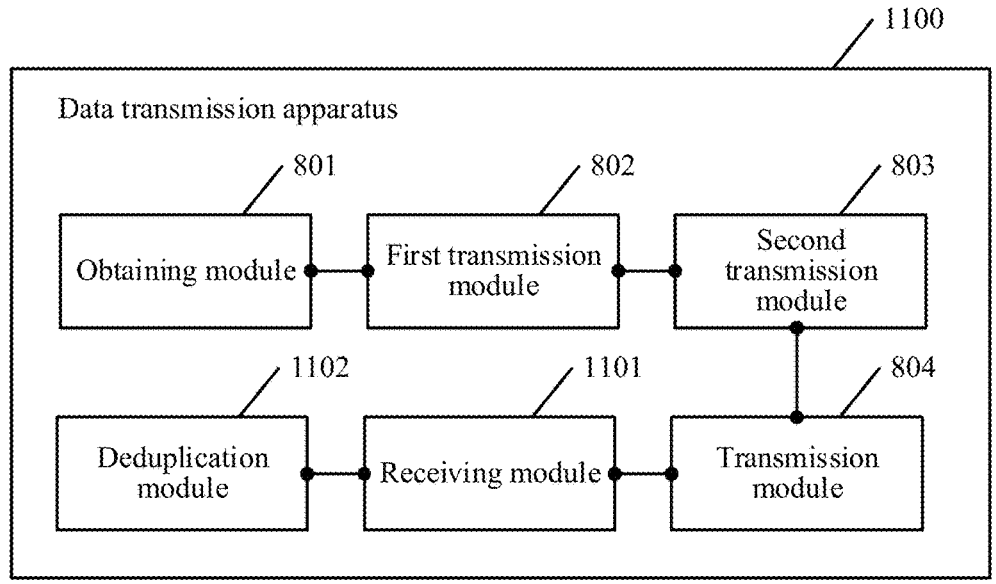
FIG. 11 is a schematic structural diagram of a fourth data transmission apparatus on a terminal device side according to an embodiment of the present disclosure.

In some implementations, on the basis of the data transmission apparatus shown in FIG. 8, FIG. 11 is a schematic structural diagram of another data transmission apparatus 1100 according to an embodiment of the present disclosure. The data transmission apparatus 1100 further includes:

a receiving module 1101, configured to receive, by using the network data channel, a reply packet returned by the first routing device, and receive, by using the short-range wireless data channel, a reply packet returned by the second routing device, the reply packets being packets returned by the application server in response to the application packet; and
 a deduplication module 1102, configured to determine, for each current reply packet, whether the current reply packet is the same as a previous reply packet received before the current reply packet is received; if yes, discard the current reply packet; and if not, transmit the current reply packet to the target application.

In some implementations, on the basis of the data transmission apparatus shown in FIG. 8, the obtaining module 801 is further configured to intercept the to-be-transmitted application packet in the target application by using a VPN service.

In some implementations, on the basis of the data transmission apparatus shown in FIG. 8, the first routing device and the second routing device are the same routing device.

In some implementations, on the basis of the data transmission apparatus shown in FIG. 8, the data transmission apparatus 800 further includes:

a target application determining module, configured to display an application configuration interface, and determine a target application selected by the user through the application configuration interface; and
 the obtaining module 801 is further configured to determine whether the application packet comes from the target application according to the source identifier of the application packet; if yes, transmit the application packet by using the network data channel and the short-range wireless data channel; and if not, transmit the application packet by using the network data channel.

In some implementations, on the basis of the data transmission apparatus shown in FIG. 8, the short-range wireless data channel is an NFC data channel.

According to the foregoing data transmission apparatus, a short-range wireless data channel (for example, a Bluetooth data channel or an NFC data channel) is used as an auxiliary channel for data transmission, and the auxiliary channel is used to assist another non-short-range wireless data channel (for example, a Wi-Fi data channel or a cellular network data channel) for data transmission. In this way, data transmission is performed based on a plurality of data channels, ensuring the stability and reliability of data transmission. In addition, because the short-range wireless data channel requires less power to transmit data, power consumption and heat emission of the terminal device can be reduced as much as possible while ensuring stable data transmission.

Figure 12:
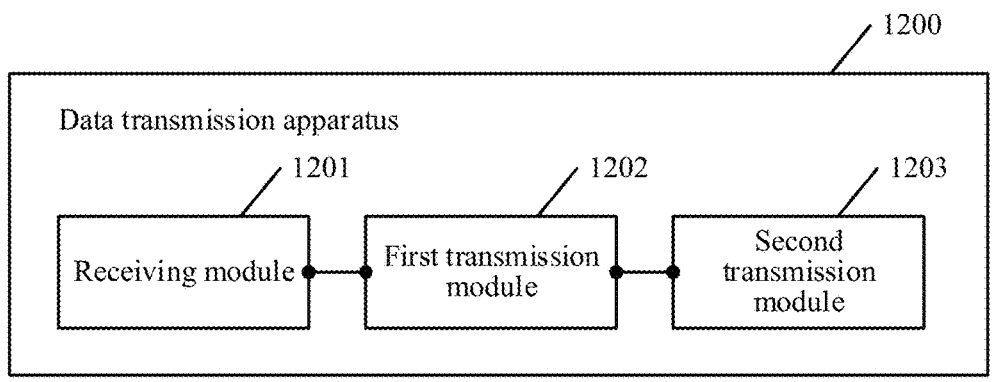
FIG. 12 is a schematic structural diagram of a data transmission apparatus on a proxy server side according to an embodiment of the present disclosure.

FIG. 12 is a schematic structural diagram of a data transmission apparatus 1200 corresponding to the foregoing data transmission method shown in FIG. 3. The data transmission apparatus 1200 includes:

a receiving module 1201, configured to receive a reply packet transmitted by an application server;
 a first transmission module 1202, configured to transmit the reply packet to a terminal device via a network data channel by using a first routing device; and
 a second transmission module 1203, configured to transmit the reply packet to the terminal device via a short-range wireless data channel different from the network data channel by using a second routing device.

Figure 13:
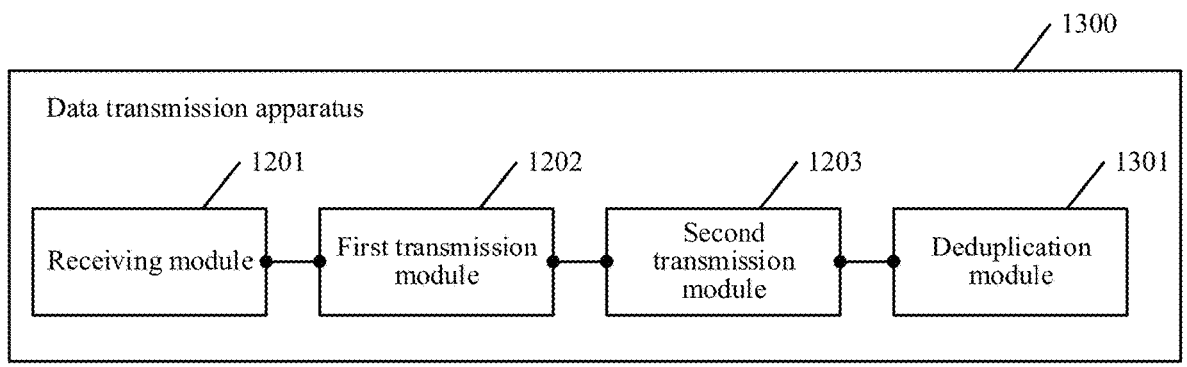
FIG. 13 is a schematic structural diagram of another data transmission apparatus on a proxy server side according to an embodiment of the present disclosure.

In some implementations, on the basis of the data transmission apparatus shown in FIG. 12, FIG. 13 is a schematic structural diagram of another data transmission apparatus 1300 according to an embodiment of the present disclosure.

The receiving module 1201 is further configured to receive the application packet transmitted by the first routing device and the application packet transmitted by the second routing device.

The data transmission apparatus 1300 further includes:

a deduplication module 1301, configured to determine, for each application packet, whether an application packet the same as the application packet has been received before the application packet is received; if yes, discard the application packet; and if not, transmit the application packet to the application server.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to the foregoing data transmission apparatus, a short-range wireless data channel (for example, a Bluetooth data channel or an NFC data channel) is used as an auxiliary channel for data transmission, and the auxiliary channel is used to assist another non-short-range wireless data channel (for example, a Wi-Fi data channel or a cellular network data channel) for data transmission. In this way, data transmission is performed based on a plurality of data channels, ensuring the stability and reliability of data transmission.

Figure 14:
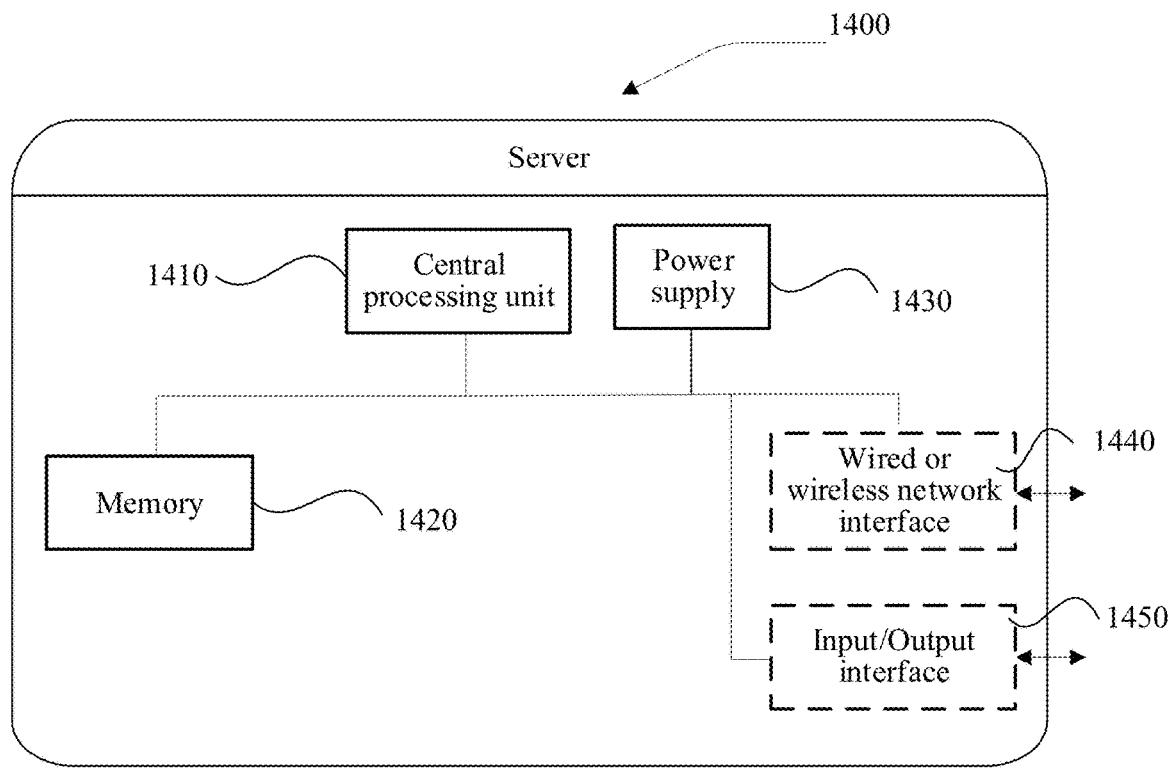
FIG. 14 is a schematic structural diagram of a server according to an embodiment of the present disclosure.

The present disclosure further provides a data transmission device. The device may be specifically a proxy server. FIG. 14 is a schematic structural diagram of a server according to an embodiment of the present disclosure. The server 1400 may vary greatly due to different configurations or performance, and may include at least one processor, for example, a central processing unit (CPU) 1410, and a memory 1420. The memory 1420 may be configured to store a software program. The software program may include at least one program instruction or module. The processor 1410 runs the software program stored in the memory 1420, to perform various functional applications and data processing, for example, implement the foregoing data transmission method in the present disclosure. In some embodiments, the server 1400 may further include a power supply 1430, and may further include a wired or wireless network interface 1440, an input/output interface 1450, and the like.

An embodiment of the present disclosure further provides a data transmission device. The device may be a terminal. The device according to the embodiments of the present disclosure is described below from the perspective of hardware materialization.

Figure 15:
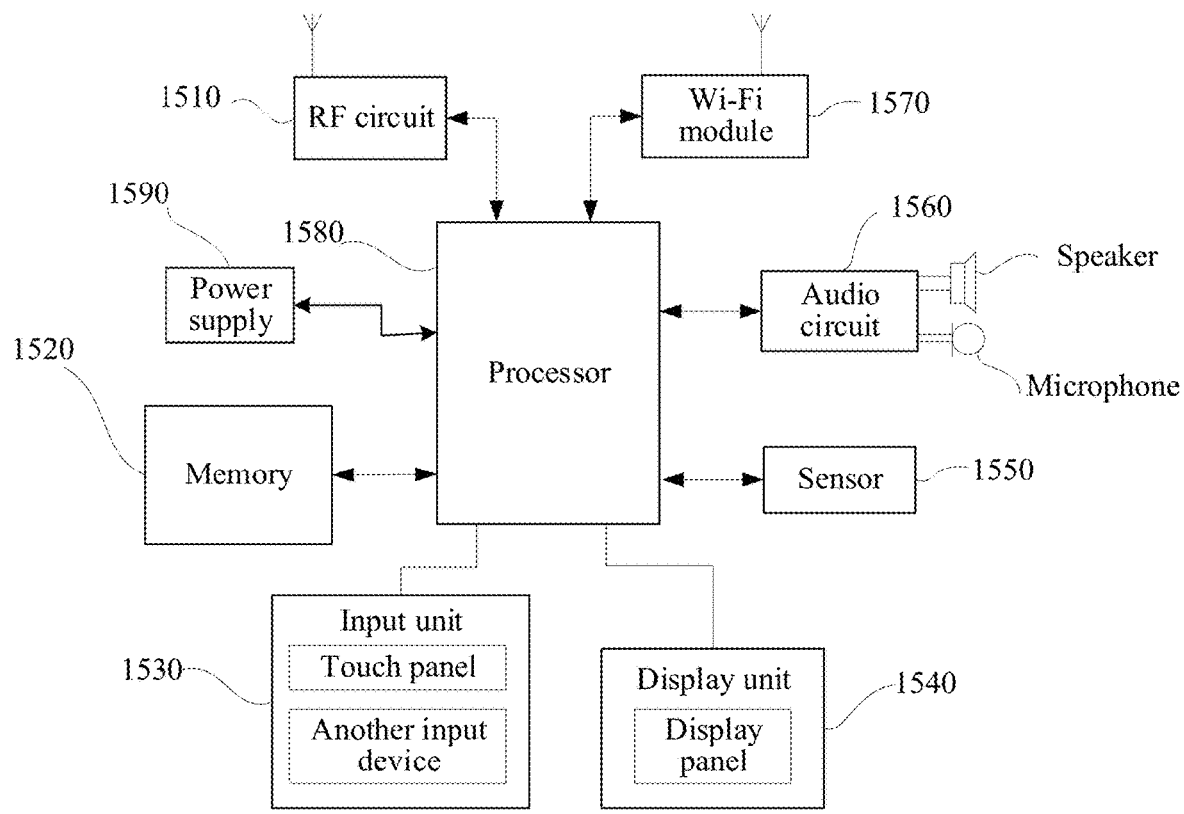
FIG. 15 is a schematic structural diagram of a terminal device according to an embodiment of the present disclosure.

An embodiment of the present disclosure further provides a terminal device. As shown in FIG. 15, for ease of description, only parts related to the embodiments of the present disclosure are shown. For specific technical details that are not disclosed, refer to the method part in the embodiments of the present disclosure. The terminal device may be any terminal device including a mobile phone, a tablet computer, a personal digital assistant (PDA), a point of sales (POS), an on-board computer, and the like, and only the terminal device being a mobile phone is used as an example.

FIG. 15 shows a block diagram of a partial structure of a mobile phone related to the terminal device according to some embodiments of the present disclosure. Referring to FIG. 15, the mobile phone includes components such as a radio frequency (RF) circuit 1510, a memory 1520, an input unit 1530, a display unit 1540, a sensor 1550, an audio circuit 1560, a Wi-Fi module 1570, a processor 1580, and a power supply 1590. A person skilled in the art may understand that the structure of the mobile phone shown in FIG. 15 does not constitute a limitation on the mobile phone, and the mobile phone may include more components or fewer components than those shown in the figure, or some components may be combined, or a different component deployment may be used.

The memory 1520 may be configured to store a software program and a module. The processor 1580 runs the software program and the module stored in the memory 1520, to implement various functional applications and data processing of the mobile phone. The memory 1520 may mainly include a program storage region and a data storage region. The program storage region may store an operating system, an application program (such as a sound play function or an image play function) that is required by at least one function, and the like. The data storage region may store data (such as audio data or a phonebook) that is created according to use of the mobile phone, and the like. In addition, the memory 1520 may include a high-speed random access memory, and may further include a nonvolatile memory, such as at least one magnetic disk storage device, a flash memory, or another volatile solid-state storage device.

The processor 1580 is a control center of the mobile phone, and is connected to various parts of the entire mobile phone by using various interfaces and lines. By running or executing the software program and/or the module stored in the memory 1520, and invoking data stored in the memory 1520, the processor executes various functions of the mobile phone and performs data processing, thereby monitoring the entire mobile phone. In actual implementation, the processor 1580 executes the software program stored in the memory 1520, to implement the data transmission method provided in the present disclosure. An embodiment of the present disclosure further provides a computer-readable storage medium, configured to store a computer program, the computer program being configured to perform any implementation in a data transmission method described in the foregoing embodiments.

An embodiment of the present disclosure further provides a computer program product including computer-readable instructions, the computer program product, when running on a computer, causing the computer to perform any implementation in a data transmission method according to the foregoing embodiments.

A person skilled in the art can clearly understand that for convenience and conciseness of description, for working processes of the foregoing described system, apparatus and unit, refer to the corresponding processes in the foregoing method embodiments, and details are not described herein again.

In the several embodiments provided in the present disclosure, it is to be understood that the disclosed system, apparatus, and method may be implemented in other manners. For example, the described apparatus embodiment is merely an example. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer storage medium. Based on such an understanding, the technical solutions of the present disclosure essentially, or the part contributing to the prior art, or all or some of the technical solutions may be implemented in the form of a software product. The computer software product is stored in a computer storage medium and includes several instructions for instructing a computer device (which may be a personal computer, a server, a network device, or the like) to perform all or some of the steps of the methods described in the embodiments of the present disclosure. The foregoing computer storage medium includes: any medium that can store a computer program, such as a USB flash drive, a removable hard disk, a read-only memory (ROM), a random access memory (RAM), a magnetic disk, or an optical disc.

It is to be understood that, in the present disclosure, "at least one" means one or more, and "a plurality of" means two or more. The term "and/or" describes an association between associated objects and represents that three associations may exist. For example, "A and/or B" may indicate that only A exists, only B exists, and both A and B exist, where A and B may be singular or plural. The character "/" in this specification generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

The foregoing embodiments are merely intended for describing the technical solutions of the present disclosure, but not for limiting the present disclosure. Although the present disclosure is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of the present disclosure.

INDUSTRIAL PRACTICABILITY

In the embodiments of the present disclosure, the terminal device obtains an application packet of a target application, transmits the application packet to a proxy server via a first routing device by using a network data channel, and transmits the application packet to the proxy server via a second routing device by using a short-range wireless data channel different from the network data channel, the application packet being provided for the proxy server to transmit the application packet to an application server corresponding to the target application based on a deduplication mechanism. In this way, the air interface packet loss rate and data latency can be effectively reduced. In addition, because the short-range wireless data channel requires less power to transmit data, power consumption and heat emission of the terminal device can be further reduced while ensuring data transmission quality.

What is claimed is:

1. A data transmission method, comprising:
obtaining, by an acceleration application on a terminal device, an application packet generated by a target application running on the terminal device;
determining, by the acceleration application, that the target application belongs to a set of applications preconfigured as applications that need accelerated transmission; and
in response to determining that the target application belongs to the set of applications:
setting, by the acceleration application, an identifier in a header of the application packet;
transmitting, by the acceleration application, the application packet with the identifier to a proxy server via a first routing device using a network data channel interface of the terminal device;
converting, by the acceleration application, the application packet into a corresponding short-range format packet and setting the identifier in a header of the corresponding short-range format packet; and
transmitting, by the acceleration application, the corresponding short-range format packet to a short-range device using a short-range wireless data channel interface of the terminal device different from the network data channel interface, wherein the short-range device converts the corresponding short-range format packet back to a corresponding application packet and transmits the corresponding application packet to the proxy server via a second routing device, and wherein the application packet and the corresponding short-range format packet both have a destination of an application server corresponding to the target application and are routed via the proxy server based on a deduplication mechanism;
after the application packet and the corresponding short-range format packet are transmitted, receiving, by the acceleration application, a current reply packet returned by the application server via the proxy server, the current reply packet being transmitted using the network data channel interface via the first routing device or using the short-range wireless data channel interface via the second routing device;
determining, by the acceleration application, that the identifier is set in the current reply packet and, in response to determining that the identifier is set in the current reply packet, determining whether a previously received reply packet has the identifier;
in response to determining that no previously received reply packet has the identifier, providing the current reply packet to the target application; and
in response to determining that a previously received reply packet has the identifier, discarding the current reply packet.

2. The method according to claim 1, wherein the transmitting the corresponding short-range format packet to the short-range device using the short-range wireless data channel interface comprises:
transmitting, by using a Bluetooth wireless local area network (BT-WLAN) data channel established between the terminal device and a Bluetooth transit device, the corresponding short-range format packet to the Bluetooth transit device, the corresponding short-range format packet being transmitted to the proxy server by the Bluetooth transit device via the second routing device.

3. The method according to claim 1, wherein the transmitting the corresponding short-range format packet to the short-range device using the short-range wireless data channel interface comprises:
converting the application packet into a Bluetooth packet; and
transmitting the Bluetooth packet to a Bluetooth transit device by using a Bluetooth (BT) data channel, the Bluetooth packet being converted by the Bluetooth transit device into the corresponding application packet to be transmitted to the proxy server via the second routing device.

4. The method according to claim 3, further comprising:
receiving a Bluetooth reply packet transmitted by the Bluetooth transit device, the Bluetooth reply packet being generated by converting a reply packet by the Bluetooth transit device, the reply packet being a packet returned by the application server via the proxy server and the second routing device in response to the corresponding application packet; and
converting the Bluetooth reply packet into a corresponding reply packet, and transmitting the corresponding reply packet to the target application.

5. The method according to claim 1, wherein the transmitting the corresponding short-range format packet to the short-range device using the short-range wireless data channel interface comprises:
converting the application packet into a Bluetooth packet; and
transmitting the Bluetooth packet to the second routing device by using a Bluetooth data channel, the Bluetooth packet being converted by the second routing device into the corresponding application packet to be transmitted to the proxy server.

6. The method according to claim 1, wherein the network data channel interface transmits communications over a network data channel comprises any one of the following:
a wireless fidelity (Wi-Fi) network data channel, a cellular network data channel, and a wired network data channel.

7. The method according to claim 1, wherein the obtaining the application packet generated by the target application comprises:
determining a source identifier of the application packet, the source identifier indicating an application source of the application packet; and
obtaining the application packet whose application source indicated by the source identifier is the target application.

8. The method according to claim 1, wherein the transmitting the corresponding short-range format packet to the short-range device using the short-range wireless data channel interface comprises:
transmitting, by using a near field communication (NFC) data channel established between the terminal device and an NFC device, the corresponding short-range format packet to the second routing device via the NFC device, so that the second routing device transmits the corresponding application packet to the proxy server.

9. The method according to claim 1, wherein
the application packet carries a source identifier, the source identifier being provided for the proxy server to transmit the application packet received for a first time to the application server corresponding to the target application based on the deduplication mechanism, and discard an application packet with the source identifier not received for the first time.

10. The method according to claim 1, wherein the obtaining the application packet generated by the target application comprises:
intercepting and obtaining, by the acceleration application using a virtual private network service, the application packet of the target application.

11. The method according to claim 10, wherein the application packet and the corresponding short-range format packet are transmitted by the acceleration application by using the network data channel interface and the short-range wireless data channel interface.

12. The method according to claim 1, further comprising:
presenting, by the acceleration application, an application configuration interface; and
determining one or more applications to be included in the set of applications preconfigured as applications that need the accelerated transmission based on user operation on the application configuration interface.

13. The method according to claim 1, wherein an application installed on the terminal device includes a configurable item about whether the application needs the accelerated transmission, and the determining that the target application belongs to the set of applications preconfigured as applications that need accelerated transmission comprises:
determining, by the acceleration application, that the application is the target application belonging to the set of applications in response to determining that a function attribute value of the application indicates that the application needs the accelerated transmission.

14. A terminal device, comprising at least one processor and at least one memory,
the at least one memory being configured to store a computer program; and
the at least one processor being configured, when running the computer program, to perform:
obtaining, by an acceleration application on the terminal device, an application packet generated by a target application running on the terminal device;
determining, by the acceleration application, that the target application belongs to a set of applications preconfigured as applications that need accelerated transmission; and
in response to determining that the target application belongs to the set of applications:
setting, by the acceleration application, an identifier in a header of the application packet;
transmitting, by the acceleration application, the application packet with the identifier to a proxy server via a first routing device using a network data channel interface of the terminal device; and
converting, by the acceleration application, the application packet into a corresponding short-range format packet and setting the identifier in a header of the corresponding short-range format packet; and
transmitting, by the acceleration application, the corresponding short-range format packet to a short-range device using a short-range wireless data channel interface of the terminal device different from the network data channel interface, wherein the short-range device converts the corresponding short-range format packet back to a corresponding application packet and transmits the corresponding application packet to the proxy server via a second routing device, and wherein the application packet and the corresponding short-range format packet both have a destination of an application server corresponding to the target application and are routed via the proxy server based on a deduplication mechanism;

after the application packet and the corresponding short-range format packet are transmitted, receiving, by the acceleration application, a current reply packet returned by the application server via the proxy server, the current reply packet being transmitted using the network data channel interface via the first routing device or by using the short-range wireless data channel interface via the second routing device;

determining, by the acceleration application, that the identifier is set in the current reply packet and, in response to determining that the identifier is set in the current reply packet, determining whether a previously received reply packet has the identifier;

in response to determining that no previously received reply packet has the identifier, providing the current reply packet to the target application; and in response to determining that a previously received reply packet has the identifier, discarding the current reply packet.

15. The terminal device according to claim 14, wherein the transmitting the corresponding short-range format packet to the short-range device using the short-range wireless data channel interface comprises:

transmitting, by using a Bluetooth wireless local area network (BT-WLAN) data channel established between the terminal device and a Bluetooth transit device, the corresponding short-range format packet to the Bluetooth transit device, corresponding short-range format packet being transmitted to the proxy server by the Bluetooth transit device via the second routing device.

16. The terminal device according to claim 14, wherein the transmitting the corresponding short-range format packet to the short-range device using the short-range wireless data channel interface comprises:

converting the application packet into a Bluetooth packet; and transmitting the Bluetooth packet to a Bluetooth transit device by using a Bluetooth (BT) data channel, the Bluetooth packet being converted by the Bluetooth transit device into the corresponding application packet to be transmitted to the proxy server via the second routing device.

17. The terminal device according to claim 16, wherein the at least one processor is further configured to perform:

receiving a Bluetooth reply packet transmitted by the Bluetooth transit device, the Bluetooth reply packet being generated by converting a reply packet by the Bluetooth transit device, the reply packet being a packet returned by the application server via the proxy server and the second routing device in response to the corresponding application packet; and converting the Bluetooth reply packet into a corresponding reply packet, and transmitting the corresponding reply packet to the target application.

18. The terminal device according to claim 14, wherein the transmitting the corresponding short-range format packet to the short-range device using the short-range wireless data channel interface comprises:

converting the application packet into a Bluetooth packet; and transmitting the Bluetooth packet to the second routing device by using a Bluetooth data channel, the Bluetooth packet being converted by the second routing device into the corresponding application packet to be transmitted to the proxy server.

19. The terminal device according to claim 14, wherein the at least one processor is further configured to perform:

receiving, by using the network data channel interface, a first reply packet returned by the application server via the first routing device; and receiving, by using the short-range wireless data channel interface, a second reply packet returned by the application server via the second routing device;

in response to determining that the first reply packet and the second reply packet have a same reply identifier, discarding a reply packet that is later received between the first reply packet and the second reply packet, wherein a reply packet that is earlier received between the first reply packet and the second reply packet is already provided by the acceleration application to the target application.

20. A non-transitory computer storage medium, storing a computer program, the computer program, when being executed by at least one processor of a terminal device, causing the at least one processor to perform:

obtaining, by an acceleration application on the terminal device, an application packet generated by a target application running on the terminal device;

determining, by the acceleration application, that the target application belongs to a set of applications preconfigured as applications that need accelerated transmission; and in response to determining that the target application belongs to the set of applications:

setting, by the acceleration application, an identifier in the header of the application packet;

transmitting, by the acceleration application, the application packet with the identifier to a proxy server via a first routing device using a network data channel interface of the terminal device;

converting, by the acceleration application, the application packet into a corresponding short-range format packet and setting the identifier in a header of the corresponding short-range format packet; and transmitting, by the acceleration application, the corresponding short-range format packet to a short-range device using a short-range wireless data channel interface different from the network data channel interface, wherein the short-range device converts the corresponding short-range format packet back to a corresponding application packet and transmits the corresponding application packet to the proxy server via a second routing device, and wherein the application packet and the corresponding short-range format packet both have a destination of an application server corresponding to the target application and are routed via the proxy server based on a deduplication mechanism;

after the application packet and the corresponding short-range format packet are transmitted, receiving, by the acceleration application, a current reply packet returned by the application server via the proxy server, the current reply packet being transmitted using the network data channel interface via the first routing device or using the short-range wireless data channel interface via the second routing device;

determining, by the acceleration application, that the identifier is set in the current reply packet and, in response to determining that the identifier is set in the current reply packet, determining whether a previously received reply packet has the identifier;

in response to determining that no previously received reply packet has the identifier, providing the current reply packet to the target application; and in response to determining that a previously received reply packet has the identifier, discarding the current reply packet.

\* \* \* \* \*